US011032622B2

(12) United States Patent
Nishino et al.

(10) Patent No.: US 11,032,622 B2
(45) Date of Patent: Jun. 8, 2021

(54) INFORMATION PROCESSING APPARATUS, INFORMATION PROCESSING METHOD, AND PROGRAM

(71) Applicant: SONY CORPORATION, Tokyo (JP)

(72) Inventors: Katsuaki Nishino, Kanagawa (JP); Susumu Matsushita, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/604,448

(22) PCT Filed: Mar. 27, 2018

(86) PCT No.: PCT/JP2018/012520
§ 371 (c)(1),
(2) Date: Oct. 10, 2019

(87) PCT Pub. No.: WO2018/193799
PCT Pub. Date: Oct. 25, 2018

(65) Prior Publication Data
US 2020/0162794 A1 May 21, 2020

(30) Foreign Application Priority Data
Apr. 18, 2017 (JP) .............................. JP2017-082140

(51) Int. Cl.
*H04N 21/488* (2011.01)
*H04L 12/24* (2006.01)
(Continued)

(52) U.S. Cl.
CPC ......... *H04N 21/4882* (2013.01); *H04L 41/22* (2013.01); *H04L 43/045* (2013.01);
(Continued)

(58) Field of Classification Search
CPC ............ H04N 21/2668; H04N 21/4882; H04L 41/22; H04L 43/045
See application file for complete search history.

(56) References Cited

U.S. PATENT DOCUMENTS 8,150,471 B2 * 4/2012 Arimoto .................. H04L 43/00
455/566
8,650,492 B1 * 2/2014 Mui ..................... H04L 43/0829
715/736
(Continued)

FOREIGN PATENT DOCUMENTS

| JP | H0556043 A | * | 3/1993 | ............ H04L 12/24 |
| JP | 2001109551 A | * | 4/2001 | ............ H04L 41/22 |

(Continued)

OTHER PUBLICATIONS

International Search Report dated May 22, 2018 in PCT/JP2018/012520, citing documents AO and AP therein, 1 page.

*Primary Examiner* — Robert J Hance
(74) *Attorney, Agent, or Firm* — Oblon, McClelland, Maier & Neustadt, L.L.P.

(57) ABSTRACT

Display information that indicates the communication status of network-connected instruments, and makes it possible to easily know an error-detected position, error contents, the extent of influence of an error and the like is generated. Display information that allows identification of data of inter-group communication between a transmission data group constituted by a plurality of pieces of transmission data, and a reception data group constituted by a plurality of pieces of reception data is generated. Information is displayed such that it becomes possible to identify whether communication of each piece of data among a plurality of pieces of communication data of each group is underway or stopped. Furthermore, at a time of occurrence of an error,
(Continued)

warning information including an error level or contents is displayed on a connection line.

20 Claims, 25 Drawing Sheets

(51) Int. Cl.
*H04L 12/26* (2006.01)
*H04N 21/2668* (2011.01)
*H04N 21/438* (2011.01)
*H04N 21/4425* (2011.01)

(52) U.S. Cl.
CPC ..... *H04N 21/2668* (2013.01); *H04N 21/4381* (2013.01); *H04N 21/4425* (2013.01)

(56) References Cited

U.S. PATENT DOCUMENTS

| | | | | |
|---|---|---|---|---|
| 9,817,563 | B1* | 11/2017 | Stokes | H04L 43/045 |
| 2002/0174223 | A1* | 11/2002 | Childers | H04L 41/0856 |
| | | | | 709/224 |
| 2007/0204231 | A1* | 8/2007 | Cunningham | H04L 41/22 |
| | | | | 715/734 |
| 2016/0057733 | A1* | 2/2016 | Grandillo | H04H 20/423 |
| | | | | 370/252 |
| 2017/0070391 | A1* | 3/2017 | Kobayashi | H04L 41/22 |
| 2018/0091392 | A1* | 3/2018 | Richards | H04L 43/08 |

FOREIGN PATENT DOCUMENTS

| | | | | |
|---|---|---|---|---|
| JP | 2011517346 A * | 6/2011 | | G06F 3/048 |
| JP | 2016-145871 A | 8/2016 | | |
| WO | WO 2016/029160 A1 | 2/2016 | | |

* cited by examiner

F I G. 1
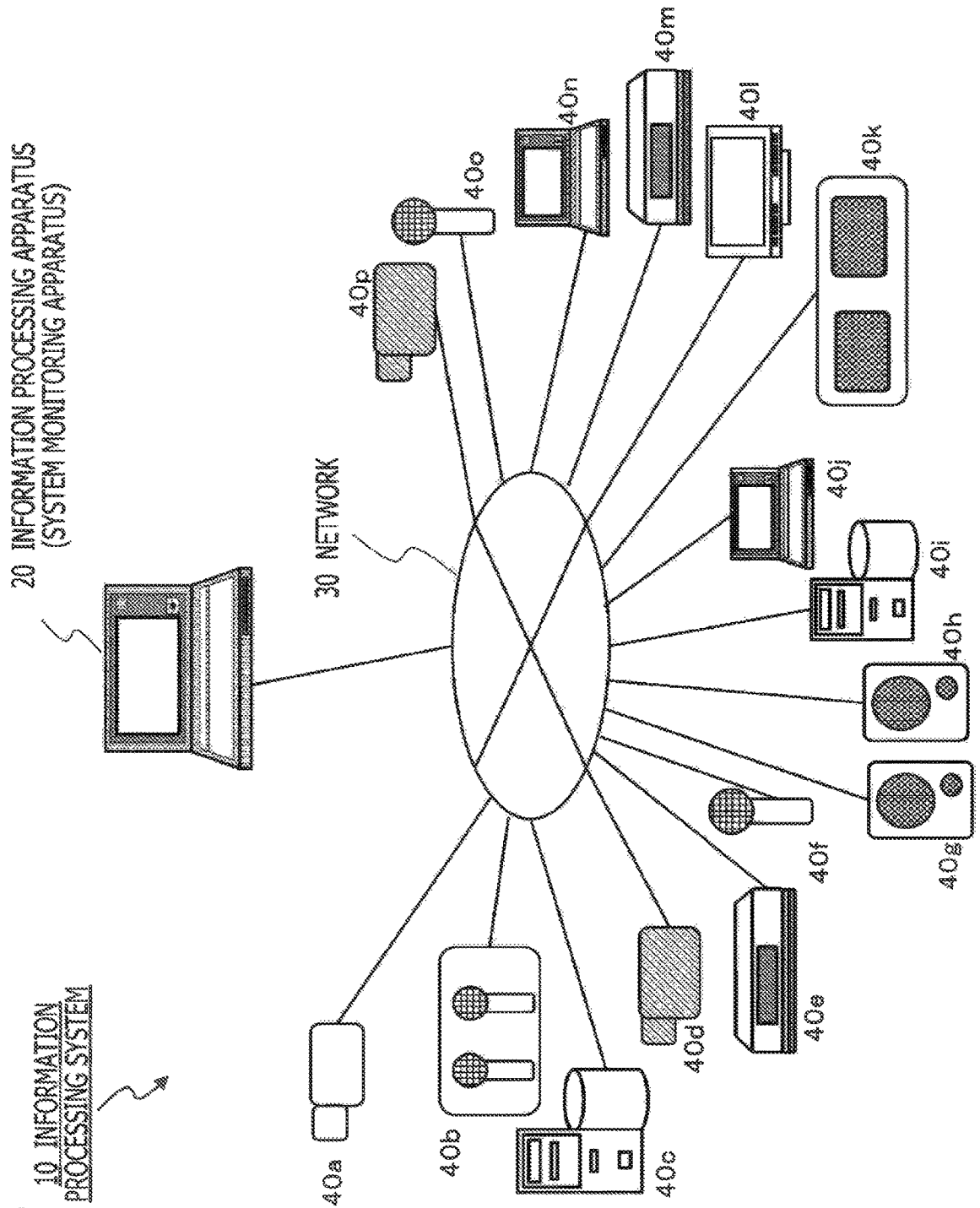

F I G. 1 3

| | COMMUNICATION DATA | (A) COMMUNICATION DATA IDENTIFIERS | | (B) CONNECTION LINE DISPLAY MODES ACCORDING TO COMMUNICATION CONDITIONS | |
|---|---|---|---|---|---|
| (1) | 4K COMPRESSED VIDEO | V(4K) COMPRESSED | COMMUNICATION-EXECUTED CONDITION | BLACK (SOLID LINE) | ↑ |
| | | | COMMUNICATION-STOPPED CONDITION | BLACK (DOTTED LINE) | ↑ |
| (2) | 4K UNCOMPRESSED VIDEO | V(4K) UNCOMPRESSED | COMMUNICATION-EXECUTED CONDITION | RED (SOLID LINE) | ↑ |
| | | | COMMUNICATION-STOPPED CONDITION | RED (DOTTED LINE) | ↑ |
| (3) | HD COMPRESSED VIDEO | V(HD) COMPRESSED | COMMUNICATION-EXECUTED CONDITION | BLUE (SOLID LINE) | ↑ |
| | | | COMMUNICATION-STOPPED CONDITION | BLUE (DOTTED LINE) | ↑ |
| (4) | JAPANESE COMPRESSED SOUND | A(J) COMPRESSED | COMMUNICATION-EXECUTED CONDITION | GREEN (SOLID LINE) | ↑ |
| | | | COMMUNICATION-STOPPED CONDITION | GREEN (DOTTED LINE) | ↑ |
| ·· | ·· | ·· | ·· | ·· | |

FIG. 14

| | ERROR EXAMPLES | (A) ERROR LEVEL IDENTIFIERS | (B) ERROR MESSAGE DISPLAY MODE |
|---|---|---|---|
| (1) | COMMUNICATION DELAY (SMALL) | WARNING | BLUE — WARNING COMMUNICATION DELAY (SMALL) |
| (2) | COMMUNICATION DELAY (LARGE) | MINOR | GREEN — MINOR COMMUNICATION DELAY (LARGE) |
| (3) | PACKET LOSS | MAJOR | YELLOW — MAJOR PACKET LOSS |
| (4) | COMMUNICATION STOPPED | CRITICAL | RED — CRITICAL COMMUNICATION STOPPED |

LOW ⟵ SEVERITY ⟶ HIGH

INFORMATION PROCESSING APPARATUS, INFORMATION PROCESSING METHOD, AND PROGRAM

TECHNICAL FIELD

The present disclosure relates to an information processing apparatus, an information processing method, and a program. More particularly, the present disclosure relates to an information processing apparatus, an information processing method, and a program that make it possible to know the communication status and error status of each transmitting or receiving instrument in a transmission and reception system for video and sound data.

BACKGROUND ART

For example, at broadcasting stations, production companies that create audiovisual media such as programs, and the like, a large number (several to several thousands) of audiovisual data processing apparatuses that perform recording, playback, accumulation, editing and the like of videos and sounds are used.

A large number of these audiovisual data processing apparatuses are used to generate and edit audiovisual data such as videos of various qualities, for example, videos of 4K images, HD images and the like, and various types of sounds, for example, various languages such as Japanese or English, stereo sound signals, or surround sound signals. These pieces of data are transmitted and received between individual instruments, and are recorded in a medium or output to an external component.

In this manner, at broadcasting stations and the like, a large number of audiovisual data processing apparatuses that perform recording, playback, accumulation, editing and the like of videos and sounds are used to perform data processing.

In an environment where a large number of instruments are used to execute data processing, various processes are executed at individual instruments, and various manners of data communication are performed between individual instruments.

An occurrence of an error at any of the apparatuses or communication error in such a situation leads to an occurrence of a problem that data processing cannot be executed at each instrument, or an occurrence of other problems.

An occurrence of such problems might develop into a significant problem that programs cannot be sent out normally at broadcasting stations and the like, or other problems, for example.

In order to prevent occurrences of such problems, error monitoring systems are often utilized at broadcasting stations and the like.

Conventional techniques disclosing error monitoring systems include PTL 1 (JP H10-229508A), for example.

This PTL 1 discloses a configuration in which a plurality of instruments as icons are displayed on a display unit of an error monitoring apparatus and, if an error is occurred in a particular instrument, display control of converting an icon and displaying a converted icon of the particular instrument is performed, so that the error-detected instrument can be easily identified.

However, there is a problem in the configuration disclosed in this PTL 1 in that, although identification of an error-detected instrument is possible, if, for example, the error-detected instrument is inputting or outputting a large number of signals (videos A, B, C . . . , sounds X, Y, Z, etc.), it is difficult to know at which input/output signal an error is occurring, which input/output signal is influenced by an error, and the like.

That is, although the configuration disclosed in PTL 1 explained above allows instrument-by-instrument error categorization, it is not a configuration that makes it possible to easily check, communication data by communication data, an error in data transmitted and received between instruments. Accordingly, there is a problem that, at a time of occurrence of an error, it becomes necessary to identify the location of the error by using another error diagnosing instrument, an error analyzing application or the like, and a certain length of time is required for identifying the cause of the error and for recovery from the error at the time of occurrence of the error.

CITATION LIST

Patent Literature

[PTL 1]
JP H10-229508A

SUMMARY

Technical Problem

The present disclosure has been made in view of the problem explained above, for example, and an object thereof is to provide an information processing apparatus, an information processing method, and a program that allow prompt identification of the presence or absence of errors in each piece of communication data, and of error-detected locations by monitoring errors that occur in a system in which a large number of instruments to execute processing on data such as videos and sounds are connected by a network and communication is performed between individual instruments therein.

Solution to Problem

A first aspect of the present disclosure provides an information processing apparatus including: a data processing unit that generates display information that allows identification of da2ta of inter-group communication between a transmission data group including a plurality of pieces of transmission data and a reception data group including a plurality of pieces of reception data.

Furthermore, a second aspect of the present disclosure provides an information processing method executed at an information processing apparatus, the information processing method including: generating, by a data processing unit of the information processing apparatus, display information that allows identification of data of inter-group communication between a transmission data group including a plurality of pieces of transmission data and a reception data group including a plurality of pieces of reception data.

Furthermore, a third aspect of the present disclosure provides a program that causes information processing to be executed at an information processing apparatus, the program including: causing a data processing unit of the information processing apparatus to generate display information that allows identification of data of inter-group communication between a transmission data group including a plurality of pieces of transmission data and a reception data group including a plurality of pieces of reception data.

Note that, for example, the program in the present disclosure is a program that can be provided in a storage medium or a communication medium that provides, in a computer-readable format, various program codes to an information processing apparatus or a computer system that can execute the various program codes. By providing such a program in a computer-readable format, processes corresponding to the program can be realized on the information processing apparatus or the computer system.

Still another object, feature or advantage of the present disclosure will become apparent from detailed explanations that are based on embodiments and attached drawings of the present disclosure that are mentioned below. Note that a system in the present specification is a logical set configuration of a plurality of apparatuses and is not limited to one in which apparatuses with individual configurations are in a single housing.

Advantageous Effects of Invention

According to the configuration of one embodiment of the present disclosure, it becomes possible to provide a user (monitor) with display information that indicates the communication status of network-connected instruments and makes it possible to easily know an error-detected position, error contents, the extent of influence of an error and the like.

Specifically, display information that allows identification of data of inter-group communication between a transmission data group constituted by a plurality of pieces of transmission data, and a reception data group constituted by a plurality of pieces of reception data is generated. Information is displayed such that it becomes possible to identify whether communication of each piece of data among a plurality of pieces of communication data of each group is underway or stopped. Furthermore, at a time of occurrence of an error, warning information including an error level or contents is displayed on a connection line.

With this configuration, it becomes possible to provide a user (monitor) with display information that indicates the communication status of network-connected instruments and makes it possible to easily know an error-detected position, error contents, the extent of influence of an error and the like.

Note that the advantages described in the present specification are merely illustrated as examples and are not limitative. There may also be additional advantages.

BRIEF DESCRIPTION OF DRAWINGS

FIG. 1 is a figure for explaining an exemplary configuration of an information processing system.

FIG. 13 is a figure for explaining exemplary details of display data of the connection information display portion.

FIG. 14 is a figure for explaining exemplary details of display data of the connection information display portion.

DESCRIPTION OF EMBODIMENTS

Figure 2:
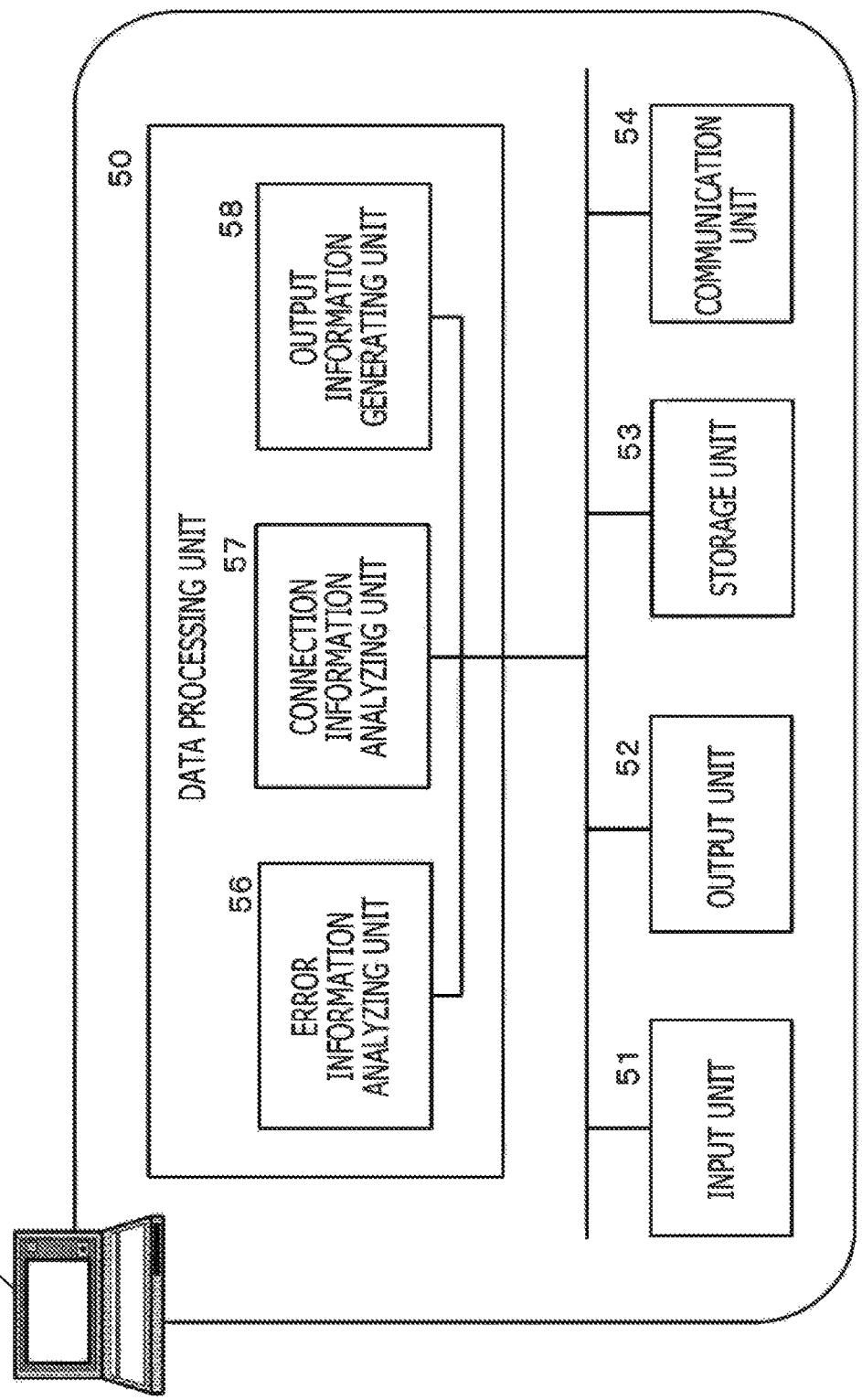
FIG. 2 is a figure for explaining an exemplary configuration of an information processing apparatus (system monitoring apparatus).

Hereinafter, details of an information processing apparatus, an information processing method, and a program of the present disclosure are explained with reference to the drawings. Note that the explanations are given according to the following items.

1. About Exemplary Configuration of Information Processing System

2. About Exemplary Configuration of Information Processing Apparatus (System Monitoring Apparatus)

3. About Groups to be Utilized as Units of Display of Display Information Generated by Information Processing Apparatus 4. About Display Information (UI) Generated by Information Processing Apparatus 4-1. About Details of Display Information of Group Selection Portion 4-2. About Details of Display Information of Connection Information Display Portion 4-3. About Details of Display Information of Detail Information Display Portion 5. About Exemplary Transition of Display Information of Information Processing Apparatus (System Monitoring Apparatus)

6. About Exemplary Configuration of Information Processing Apparatus

7. Application Examples

8. Summary of Configuration of Present Disclosure

1. About Exemplary Configuration of Information Processing System

First, an exemplary configuration of an information processing system to which processes of the present disclosure can be applied is explained with reference to FIG. 1.

FIG. 1 is a figure illustrating one exemplary configuration of an information processing system 10 to which processes of the present disclosure can be applied.

The information processing system 10 illustrated in FIG. 1 is set, for example, at a broadcasting station, a production company that creates audiovisual media such as programs or the like.

The information processing system 10 is a system in which a large number of instruments 40a to 40p which are data processing apparatuses that perform acquisition, editing, recording, playback, accumulation or the like of videos and sounds are connected to a network 30.

For example, a large number of the instruments 40a to 40p are used to generate and edit video and sound data such as videos of various qualities, for example, videos of 4K images, HD images and the like, and various types of sounds, for example, sounds of Japanese, English and the like, stereo sounds, or surround sounds. These pieces of data are transmitted and received between individual instruments, and are subjected to processes such as recording in a medium, or output to an external component.

An information processing apparatus (system monitoring apparatus) 20 illustrated in FIG. 1 monitors the data processing status in individual instruments constituting the information processing system 10, that is, the instruments 40a to 40p which are data processing apparatuses, and the status of communication between the individual instruments.

Specifically, for example, the occurrence status of errors that occur at each instrument or communication errors in inter-instrument communication is displayed on a display unit.

Specific examples of this are explained in detail below.

The network 30 is an IP (Internet Protocol) network, for example. Each instrument preferably has a cabled connection setting.

It should be noted that, however, there may be wireless connection instruments.

In data transmission and reception through the IP network, various types of data (images, sounds, etc.) are stored in individual packets, and transmitted and received via communication cables (LAN cables).

Since in communication utilizing the IP network, various types of data such as videos and sounds are transmitted through one cable in a time-divided manner, it is difficult to categorize what type of data is transmitted and received from which instrument to which instrument even if physical wiring configurations are looked at.

Data transmitted and received via the network 30 includes many types of data such as 4K videos, HD videos, SD videos, Japanese sounds, English sounds, monaural sound, and stereo sounds, for example, and these various types of data are transmitted and received mutually between the network-connected instruments 40a to 40p illustrated in FIG. 1.

Note that the network-connected instruments 40a to 40p include various instruments illustrated in FIG. 1, for example, instruments such as cameras, microphones, recorders, players, monitors, and editing apparatuses, and, other than them, include various broadcasting instruments, instruments for broadcasting, systems for use at broadcasting stations, cameras for broadcasting, microphones for broadcasting, and the like.

The information processing apparatus (system monitoring apparatus) 20 illustrated in FIG. 1 displays, on a display unit, display information, that is, a user interface (UI), that makes it possible to know the data processing status at a large number of such instruments or the data communication status between individual instruments easily and accurately.

For example, a user (monitor) can immediately determine in which instrument connected to the network an error is occurring, in which inter-instrument communication an error is occurring, or the like by looking at the UI of the information processing apparatus (system monitoring apparatus) 20.

Furthermore, the user can also immediately determine the extent of influence that one error has, which indicates which instruments are influenced by the one error. For example, the user can also immediately determine a group of instruments or the like influenced by the one error.

Specific examples of display information (UI) generated by the information processing apparatus (system monitoring apparatus) 20 are mentioned below.

2. About Exemplary Configuration of Information Processing Apparatus (System Monitoring Apparatus)

Next, an exemplary configuration of the information processing apparatus (system monitoring apparatus) 20 illustrated in FIG. 1 is explained with reference to FIG. 2.

As has been explained above, the information processing apparatus (system monitoring apparatus) 20 monitors the data processing status at individual instruments constituting the information processing system 10 illustrated in FIG. 1, that is, the instruments 40a to 40p which are audiovisual data processing apparatuses, and the status of communication between the individual instruments.

Specifically, for example, the occurrence status of errors that occur at each instrument or communication errors in inter-instrument communication is displayed on a display unit.

As illustrated in FIG. 2, the information processing apparatus 20 has a data processing unit 50, an input unit 51, an output unit 52, a storage unit 53, and a communication unit 54.

The data processing unit 50 has an error information analyzing unit 56, a connection information analyzing unit 57, and an output information generating unit 58.

The information processing apparatus 20 receives information (instrument information) indicating the state of each instrument from each network-connected instrument via the communication unit 54.

The instrument information includes communication information, error information or the like regarding each instrument, for example.

The communication information includes information such as transmission source information, transmission destination information, or communication data type (4K video, Japanese sound, etc.) regarding each instance of communication that is being executed, stopped or reserved.

Note that in one possible configuration, a dedicated apparatus that accumulates communication information or error information regarding these individual instruments may be installed separately from the information processing apparatus 20.

Figure 3:
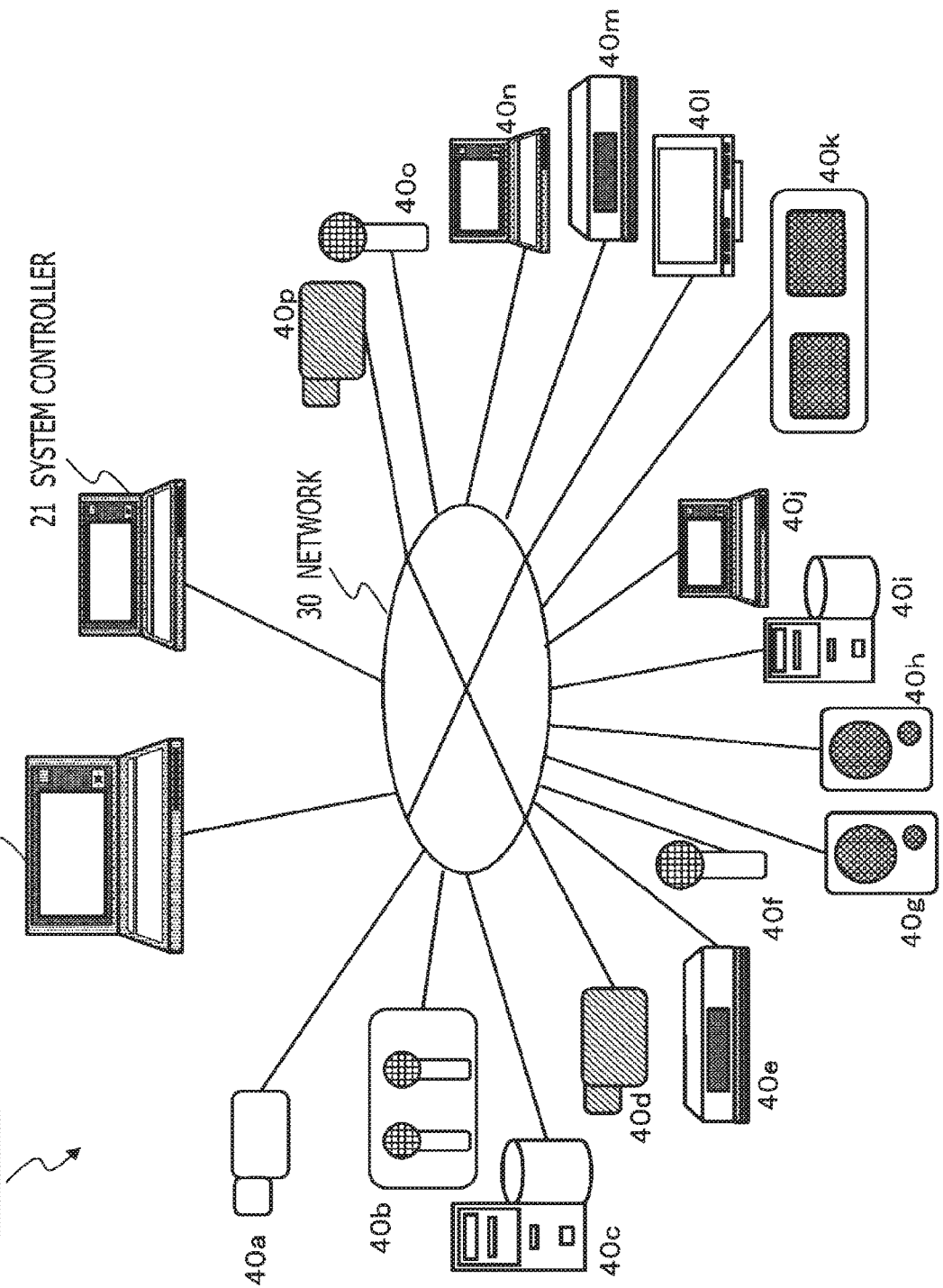
FIG. 3 is a figure for explaining an exemplary configuration of the information processing system.

For example, as illustrated in FIG. 3, a system controller 21 separate from the information processing apparatus 20 is connected to the network 30, and the system controller 21 acquires instrument information regarding each instrument from each network-connected instrument. The information processing apparatus 20 collectively acquires the information acquired by the system controller 21.

Such a configuration may be employed.

The configuration and processes of the information processing apparatus 20 illustrated in FIG. 2 are explained.

The input unit 51 is constituted by input apparatuses such as a keyboard and a mouse, for example. Note that if the output unit 52 is configured as a display unit in the form of a touch panel, the output unit 52 also functions as an input unit.

The output unit 52 is constituted by a display unit, a sound output unit, and the like. The display unit displays information that is based on instrument information regarding network-connected instruments, for example, information including error information regarding instruments, connected-instrument information, and the like.

The communication unit 54 communicates with the network-connected instruments 40 illustrated in FIG. 1 and FIG. 3, or the controller 21 illustrated in FIG. 3 via the network 30, and acquires instrument information regarding each instrument and the like.

The data processing unit 50 has the error information analyzing unit 56, the connection information analyzing unit 57, and the output information generating unit 58.

The error information analyzing unit 56 acquires and analyzes the error state of network-connected instruments. Note that the errors include both data processing errors at each instrument and inter-instrument communication errors.

The connection information analyzing unit 57 acquires and analyzes information such as transmission source information, transmission destination information, and communication data type (4K video, Japanese sound, etc.) regarding each instance of communication that is being executed, stopped or reserved between individual network-connected instruments.

The information acquired and analyzed by the error information analyzing unit 56 and connection information analyzing unit 57 is output to the output information generating unit 58.

The output information generating unit 58 generates information for presentation to a user (UI information) based on information input from the error information analyzing unit 56 and connection information analyzing unit 57, and displays the information on a display unit.

3. About Groups to be Utilized as Units of Display of Display Information Generated by Information Processing Apparatus Next, groups to be utilized as units of display of display information generated by the information processing apparatus 20 are explained.

Via the network 30, the network-connected instruments 40 illustrated in FIG. 1 execute transmission and reception of various types of video data such as 4K videos, HD videos and SD videos, various languages such as Japanese sounds and English sounds, and various types of sound data such as monaural sounds, stereo sounds, and surround sounds, for example.

Inter-instrument communication data includes not only the data types explained above, but also multiple types of differently encoded data to which different encoding techniques (codecs) are applied, and, moreover, include various types of data for which different codecs or formats are applied, such as data in different formats having different color depths or the like, for example.

The information processing apparatus 20 sets a group in which such many different types of transmission/reception data are logically combined, and generates group-by-group display information.

The groups include the following groups, for example.

Transmission data groups (SG: Source Groups)

Reception data groups (DG: Destination Groups)

These groups are sets of data that can be controlled collectively, for example.

For example, a set of data for which control of transmission and reception such as transmission start/end processing or reception start/end processing can be collectively executed is set as one group.

Specifically, for example, two pieces of transmission data which are 4K image data which is captured images of one certain camera and Japanese sound data acquired by a certain microphone are set as one transmission data group (SG1).

These two pieces of transmission data are a combination of data for which processes such as transmission start and end are performed collectively.

In addition, for example, 4K image data received for display on a certain monitor and sound data received for output from a speaker attached to the monitor are set as one reception data group (DG1).

These two pieces of reception data are a combination of data for which processes such as reception start and end are performed collectively.

In this manner, many types of transmission data transmitted by individual transmitting instruments and many types of reception data received by individual receiving instruments are grouped into groups each including data that can be collectively controlled, and the following individual groups are set.

Transmission data groups (SG: Source Groups)

Reception data groups (DG: Destination Groups)

A specific control example using such group setting is explained.

For example, it is assumed that there are the following two transmission data groups (SG) and reception data groups (DG).

(1) A "transmission data group 1 (SG1)" and a "reception data group 1 (DG1)" constituted by a captured image of a camera 1 and an acquired sound of a microphone 1.

(2) A "transmission data group 2 (SG2)" and a "reception data group 2 (DG2)" constituted by a captured image of a camera 2 and an acquired sound of a microphone 2.

For example, it is assumed that the two transmission data groups (SG1 and SG2), and reception data groups (DG1 and DG2) explained above are being transmitted and received via a network.

It is assumed that A recorder A which is one of receiving apparatuses connected to the network is performing a process of selectively receiving these two groups of data and recording the data in a medium.

If an error occurred in reception of an image from a camera 1 which is a constituent element of the reception data group 1 (DG1) when the recorder A is recording image and sound data of the reception data group 1 (DG1), it becomes possible for the recorder A to perform a process of switching recorded data from the image and sound data of the reception data group 1 (DG1) to image and sound data of the reception data group 2 (DG2).

In this manner, it is possible to attempt to enhance the process efficiency by performing switching between start and end of transmission group by group by dividing transmission/reception data into groups.

Note that although in the example mentioned above, data constituting the transmission data group (SG1) and data constituting reception data group (DG1) are identical data, communication data constituting these groups needs not be set to match each other.

One transmission data group (SG) is a set of transmission data on which transmission control such as start and end of a transmission process can be executed collectively; on the other hand, a reception data group (DG) is a set of transmission data on which transmission control such as start and end of a reception process can be executed collectively.

Accordingly, data constituting a transmission data group (SG) and data constituting a reception data group (DG) are different from each other in some cases.

A group is a set of data on which collective control is possible and, for example, can be set as a logical set of differently formatted data such as various images or sounds.

Data transmitting apparatuses which execute data transmission processes are selected from the network-connected instruments 40 illustrated in FIG. 1, and exemplary transmission data groups (SG) are set by classifying transmission data from the selected data transmitting apparatuses. Those transmission data groups (SG) are explained with reference to FIG. 4.

Figure 4:
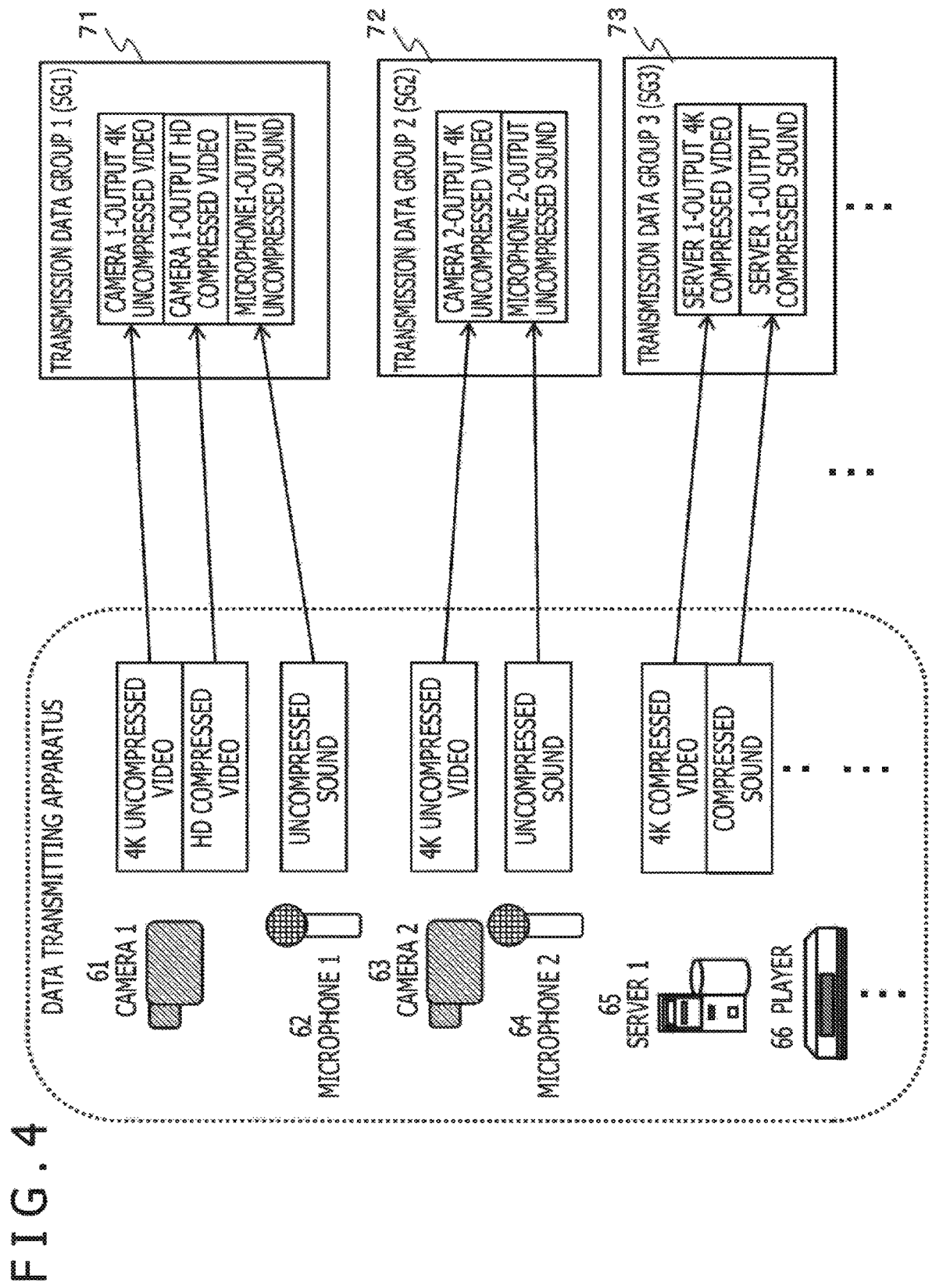
FIG. 4 is a figure for explaining exemplary setting of transmission data groups.

FIG. 4 illustrates a camera 1, 61, a microphone 1, 62, a camera 2, 63, a microphone 2, 64, a server 1, 65, and a player 66 as data transmitting apparatuses selected from the network-connected instruments 40 illustrated in FIG. 1.

Each of these apparatuses is a data transmitting apparatus that executes a data transmission process through the network 30 illustrated in FIG. 1.

For example, the camera 1, 61 transmits a 4K uncompressed video, and also transmits an HD compressed video.

That is, the camera 1, 61 captures a 4K video, generates video signals at two different resolutions, 4K uncompressed video signals and HD compressed video based on the captured 4K video, and transmits these two types of video signals to one or multiple receiving apparatuses via the network 30.

The microphone 1, 62 transmits sound signals acquired by the microphone 1 to one or multiple receiving apparatuses via the network 30.

Note that any of the data transmitting apparatuses such as cameras or microphones illustrated in the figure includes a communication unit and have functions of executing data communication conforming to an IP protocol.

Note that pre-processing for performing IP communication, for example, pre-processing such as a verification process, a process of setting addresses, port numbers or the like of a transmission source and a transmission destination, or a checking process is executed in advance between a transmitting apparatus and a receiving apparatus to establish a communication session between the transmitting apparatus and the receiving apparatus, and then a communication process utilizing IP packets is performed.

In the example illustrated in FIG. 4, a transmission data group 1 (SG1) 71 is a group of the following three types of data, that is, a group formed by combining three types of transmission data:

a 4K uncompressed video transmitted by the camera 1, 61;

an HD compressed video transmitted by the camera 1, 61; and an uncompressed sound transmitted by the microphone 1, 62.

As mentioned above, one group is set as a set of data on which control of data transmission and reception, for example, start and end of data transmission and reception, can be executed at the same timing, for example.

Specifically, one group is constituted by a combination of video and sound data of a particular camera constituting a certain program or the like, for example.

The transmission data group 1 (SG1) 71 illustrated in FIG. 4 is a group consisting of a set of a video and sound captured by the camera 1, 61.

Data constituting this transmission data group 1 (SG1) 71 is a set of data on which data transmission control, for example, start and end of data transmission, can be executed at the same timing, and one piece of content constituted by the video and sound is established by distributing this group of data collectively to the outside, or recording this group of data collectively in a medium.

Note that the transmitting apparatuses that output the transmission data in the transmission data group 1 (SG1) 71, that is, the two instruments:

the camera 1, 61; and the microphone 1, 62, form one instrument group constituting the transmitting apparatuses of the transmission data group 1 (SG1) 71.

In addition, a transmission data group 2 (SG2) 72 illustrated in FIG. 4 is a group of the following two types of data, that is, a group formed by combining two types of transmission data:

a 4K uncompressed video transmitted by the camera 2, 63; and an uncompressed sound transmitted by the microphone 2, 64.

Data constituting the transmission data group 2 (SG2) 72 is also a set of data on which data transmission control, for example, start and end of data transmission, can be executed at the same timing, and one piece of content constituted by the video and sound is established by distributing this group of data collectively to the outside, or recording this group of data collectively in a medium.

Note that the transmitting apparatuses that output the transmission data in the transmission data group 2 (SG2) 72, that is, the two instruments:

the camera 2, 63; and the microphone 2, 64, form one instrument group constituting the transmitting apparatuses of the transmission data group 2 (SG2) 72.

Furthermore, a transmission data group 3 (SG3) 73 illustrated in FIG. 4 is a group of the following two types of data, that is, a group formed by combining two types of transmission data:

a 4K compressed video transmitted by the server 1, 65; and a compressed sound transmitted by the server 1, 65.

Data constituting the transmission data group 3 (SG3) 73 is also a set of data on which data transmission control, for example, start and end of data transmission, can be executed at the same timing, and one piece of content constituted by the video and sound is established by distributing this group of data collectively to the outside, or recording this group of data collectively in a medium.

Note that the transmitting apparatus that outputs the transmission data in the transmission data group 3 (SG3) 73, that is, the server 1, 65 forms one instrument group constituting the transmitting apparatus of the transmission data group 3 (SG3) 73. In this manner, one instrument group is set with one apparatus in some cases.

Exemplary group-by-group control is explained.

For example, in the following example explained, group-by-group control is performed such that if one piece among data constituting each group is missing, distribution to the outside or recording in a medium is prohibited.

For example, control is performed to be set such that if an error occurs in transmission of "the 4K uncompressed video transmitted by the camera 1, 61" included in the transmission data group 1 (SG1) 71, the data in the transmission data group 1 (SG1) 71 is not utilized even if the other data, the pieces of data:

"the HD compressed video transmitted by the camera 1, 61"; and

"the uncompressed sound transmitted by the microphone 1, 62,"

are being transmitted and received.

In this case, another group, the transmission data group 2 (SG2) 72 or the transmission data group 3 (SG3) 73, is utilized as data for distribution to the outside or recording in a medium.

By performing group-by-group control in this manner, it becomes possible to perform a process in which content constituted by a video and a sound are distributed or recorded in a medium without interruptions.

Note that transmitting apparatuses to execute data transmission and transmission data groups may not have one-to-one relationships, but transmission data of one transmitting apparatus can be set to be included in a plurality of transmission data groups. For example, this setting is illustrated in FIG. 5.

Figure 5:
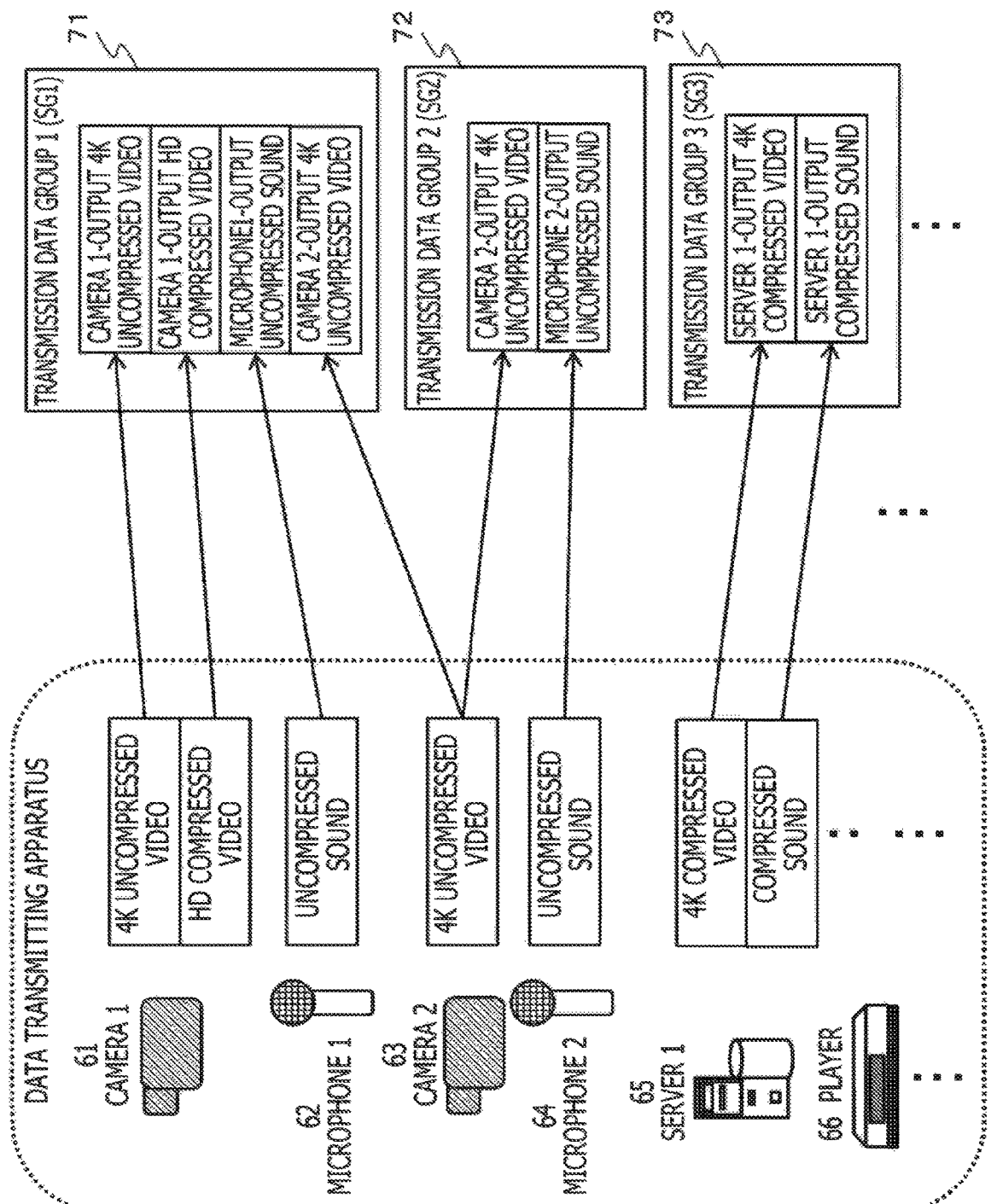
FIG. 5 is a figure for explaining exemplary setting of transmission data groups.

In the example illustrated in FIG. 5, the following transmission data, that is, the transmission data, the 4K uncompressed video transmitted by the camera 2, 63, is included in two groups, the transmission data group 1 (SG1) 71 and the transmission data group 2 (SG2) 72. In this manner, transmitting apparatuses to execute data transmission and transmission data groups may not have one-to-one relationships, but transmission data of one transmitting apparatus can be set to be included in a plurality of transmission data groups.

Exemplary settings of transmission data groups are explained with reference to FIG. 4 and FIG. 5.

Next, an exemplary setting of reception data groups (DG) is explained with reference to FIG. 6.

Figure 6:
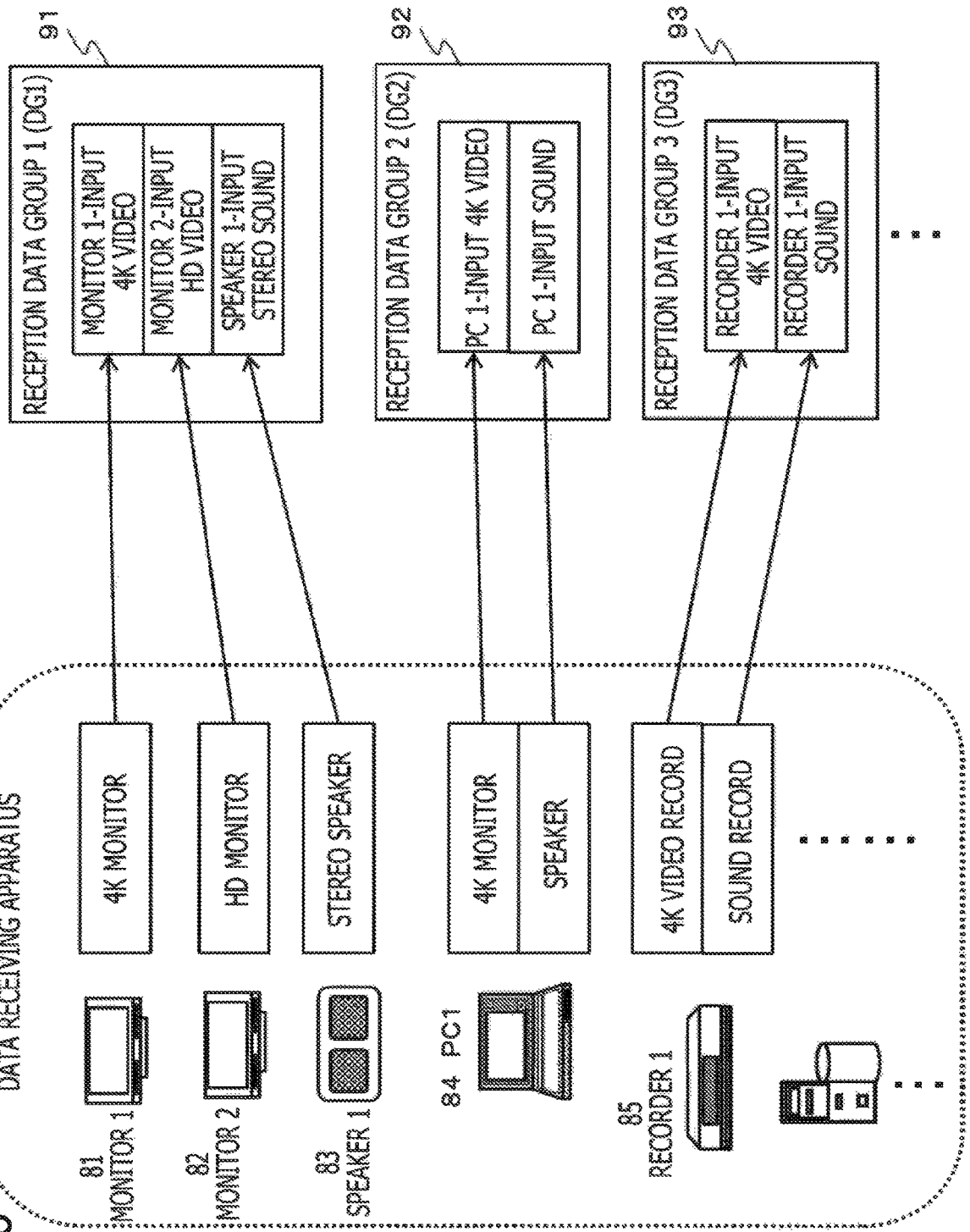
FIG. 6 is a figure for explaining exemplary setting of reception data groups.

FIG. 6 illustrates a monitor 1, 81, a monitor 2, 82, a speaker 1, 83, a PC 1, 84, and a recorder 1, 85 as data receiving apparatuses selected from the network-connected instruments 40 illustrated in FIG. 1.

Each of these apparatuses is a data receiving apparatus that executes a data reception process through the network 30 illustrated in FIG. 1.

For example, the monitor 1, 81 is a 4K monitor capable of displaying 4K images.

The monitor 2, 82 is an HD monitor capable of displaying HD images.

The speaker 1, 83 is a stereo speaker capable of outputting stereo sounds.

The PC 1, 84 has a 4K monitor capable of outputting a 4K video and a speaker capable of outputting a sound.

The recorder 1, 86 is a recorder capable of recording a 4K video and a sound in a medium.

Note that any of the data receiving apparatuses such as monitors or a speaker illustrated in the figure includes a communication unit, and have functions of executing data communication conforming to an IP protocol.

In the example illustrated in FIG. 6, a reception data group 1 (DG1) 91 is a group of the following three types of data, that is, a group formed by combining three types of reception data:

a 4K video received by the monitor 1, 81;

an HD video received by the monitor 2, 82; and a sound received by the speaker 1, 83.

The reception data group 1 (DG1) 91 is a set of data on which control of data reception, for example, start and end of data reception, can be executed at the same timing.

Specifically, for example, the reception data group 1 (DG1) 91 is a combination of video and sound data of a particular camera constituting a certain program, and one piece of content constituted by the video and sound is established by distributing this group of data collectively to the outside, or recording this group of data collectively in a medium.

Note that the receiving apparatuses that receive reception data in the reception data group 1 (DG1) 91, that is, the three instruments:

the monitor 1, 81;

the monitor 2, 82; and the speaker 1, 83, form one instrument group constituting the receiving apparatuses of the reception data group 1 (DG1) 91.

In addition, a reception data group 2 (DG2) 92 illustrated in FIG. 6 is a group of the following two types of data, that is, a group formed by combining two types of reception data:

a 4K video received by the PC 1, 84; and a sound received by the PC 1, 84.

Data constituting the reception data group 2 (DG2) 92 is also a set of data on which data reception control, for example, start and end of data reception, can be executed at the same timing, and one piece of content constituted by the video and sound is established by distributing this group of data collectively to the outside, or recording this group of data collectively in a medium.

Note that the receiving apparatus that receives reception data in the reception data group 2 (DG2) 92, that is, the PC 1, 83 forms one instrument group constituting the receiving apparatus of the reception data group 2, 92.

Furthermore, a reception data group 3 (DG3) 93 illustrated in FIG. 6 is a group of the following two types of data, that is, a group formed by combining two types of reception data:

a 4K video received by the recorder 1, 85; and a sound received by the recorder 1, 85.

Data constituting the reception data group 3 (DG3) 93 is also a set of data on which data reception control, for example, start and end of data reception, can be executed at the same timing, and one piece of content constituted by the video and sound is established by distributing this group of data collectively to the outside, or recording this group of data collectively in a medium.

Note that the receiving apparatus that receives reception data in the reception data group 3 (DG3) 93, that is, the recorder 1, 85 forms one instrument group constituting the receiving apparatus of the reception data group 3, 93.

Note that receiving apparatuses to execute data reception and reception data groups may not have one-to-one relationships, but reception data of one receiving apparatus can be set to be included in a plurality of reception data groups. For example, this setting is illustrated in FIG. 7.

Figure 7:
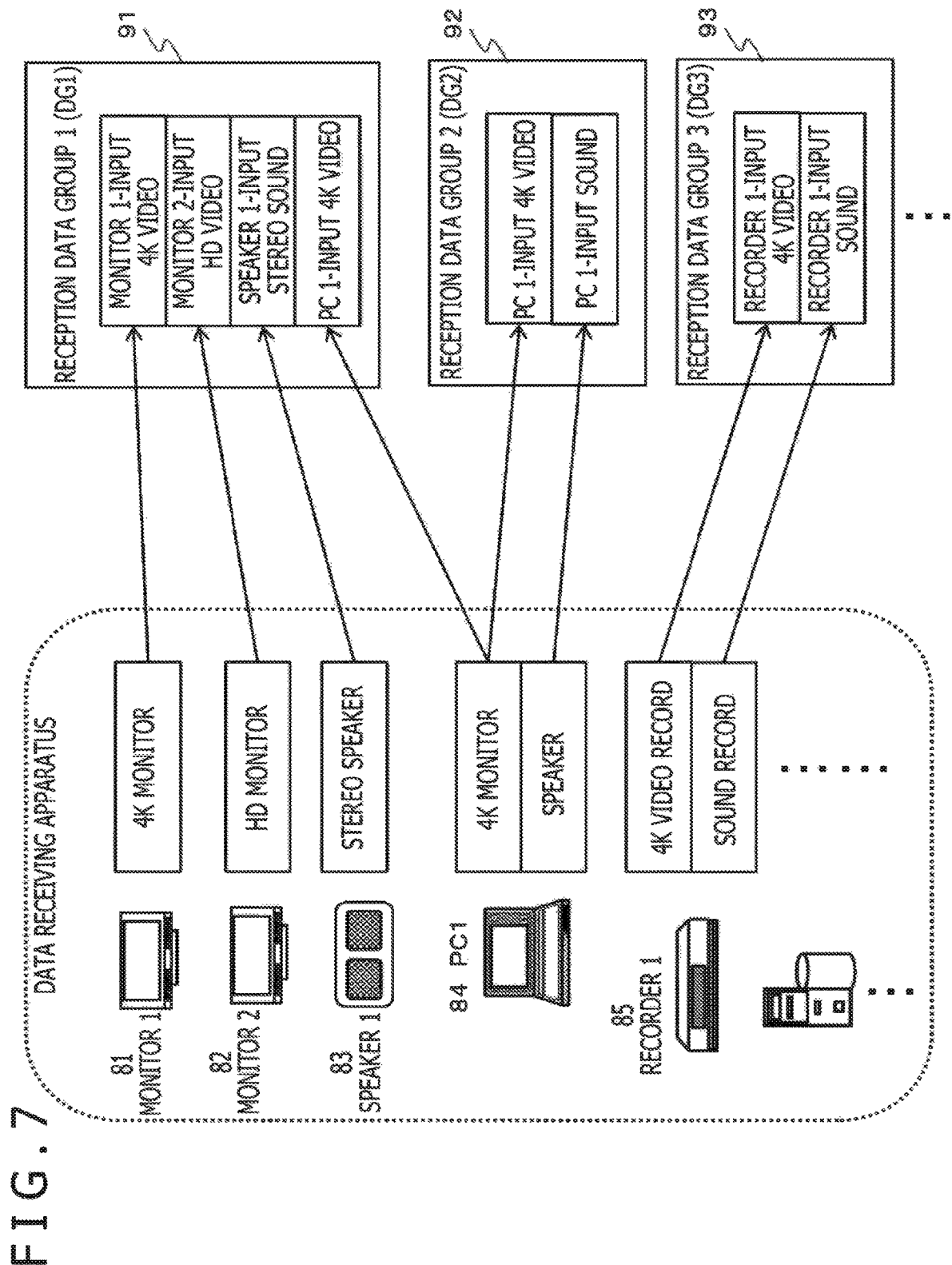
FIG. 7 is a figure for explaining exemplary setting of reception data groups.

In the example illustrated in FIG. 7, the following reception data, that is, the reception data, the 4K video received by the PC 1, 84, is included in two groups, the reception data group 1 (DG1) 91 and the reception data group 2 (DG2) 92. In this manner, receiving apparatuses to execute data reception and reception data groups may not have one-to-one relationships, but reception data of one receiving apparatus can be set to be included in a plurality of reception data groups.

Exemplary correspondences between the transmission data groups (SG) explained with reference to FIG. 4 and the reception data groups (DG) explained with reference to FIG. 6, that is, exemplary transmission and reception settings of individual pieces of data, are explained with reference to FIG. 8.

Figure 8:
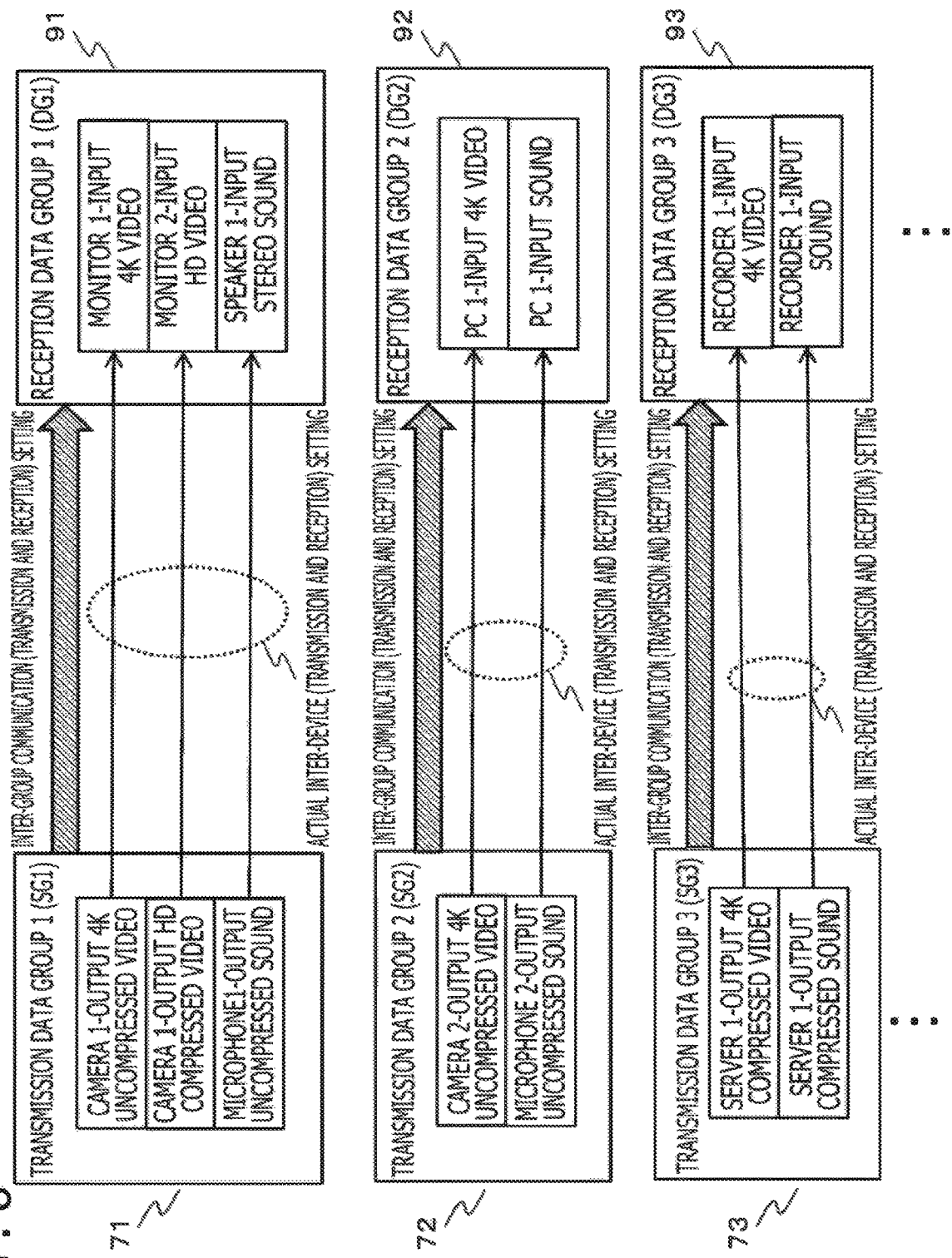
FIG. 8 is a figure for explaining exemplary setting of communication between transmission data groups and reception data groups.

FIG. 8 is a figure for explaining correspondences between the transmission data groups 1 to 3 (SG1 to SG3), 71 to 73 explained with reference to FIG. 4, and the reception data groups 1 to 3 (DG1 to DG3), 91 to 93 explained with reference to FIG. 6.

The transmission data group 1 (SG1) 71 is constituted by the three pieces of data:

the camera 1-output 4K uncompressed video;

the camera 1-output HD compressed video; and the microphone 1-output uncompressed sound.

On the other hand, the reception data group 1 (DG1) 91 is constituted by the three pieces of data:

the monitor 1-input 4K video;

the monitor 2-input HD video; and the speaker 1-input sound.

The "camera 1-output 4K uncompressed video" in the transmission data group 1 (SG1) 71 corresponds to the "monitor 1-input 4K video," which is a constituent element of the reception data group 1 (DG1) 91.

That is, the camera 1, which is a transmitting apparatus, and the monitor 1, which is a receiving apparatus, transmit and receive the 4K uncompressed video via the network.

In addition, the "camera 1-output HD compressed video" in the transmission data group 1 (SG1) 71 corresponds to the "monitor 2-input HD video," which is a constituent element of the reception data group 1 (DG1) 91.

That is, the camera 1, which is a transmitting apparatus, and the monitor 2, which is a receiving apparatus, transmit and receive the HD compressed video via the network.

Furthermore, the "microphone 1-output uncompressed sound" in the transmission data group 1 (SG1) 71 corresponds to the "speaker 1-input stereo sound," which is a constituent element of the reception data group 1 (DG1) 91.

That is, the microphone 1, which is a transmitting apparatus, and the speaker 1, which is a receiving apparatus, transmit and receive the uncompressed sound via the network.

The transmission data group 1 (SG1) 71 and reception data group 1 (DG1) 91 are a set (combination) of data groups for which inter-group communication (transmission and reception) settings that allow group-by-group control, for example, collective control of transmission and reception start, stop, and the like, are possible.

It should be noted that, however, individual pieces of data belonging to the transmission data group 1 (SG1) 71 and reception data group 1 (DG1) 91 can each be independently communicated between individual data transmitting apparatuses (transmitting devices) and data receiving apparatuses (receiving devices).

The transmission data group 2 (SG2) 72 illustrated in FIG. 8 is constituted by the two pieces of data:

the camera 2-output 4K uncompressed video; and the microphone 2-output uncompressed sound.

On the other hand, the reception data group 2 (DG2) 92 is constituted by the two pieces of data:

the PC 1-input 4K video; and the PC 1-input sound.

The "camera 2-output 4K uncompressed video" in the transmission data group 2 (SG2) 72 corresponds to the "PC 1-input 4K video," which is a constituent element of the reception data group 2 (DG2) 92.

That is, the camera 2, which is a transmitting apparatus, and the PC 1, which is a receiving apparatus, transmit and receive the 4K uncompressed video via the network.

In addition, the "microphone 2-output uncompressed sound" in the transmission data group 2 (SG2) 72 corresponds to the "PC 1-input sound," which is a constituent element of the reception data group 2 (DG2) 92.

That is, the microphone 2, which is a transmitting apparatus, and the PC 1, which is a receiving apparatus, transmit and receive an uncompressed sound via the network.

Furthermore, the transmission data group 3 (SG3) 73 illustrated in FIG. 8 is constituted by the two pieces of data:

the server 1-output 4K uncompressed video; and the server 1-output compressed sound.

On the other hand, the reception data group 3 (DG3) 93 is constituted by the two pieces of data:

the recorder 1-input 4K video; and the recorder 1-input sound.

The "server 1-output 4K uncompressed video" in the transmission data group 3 (SG3) 73 corresponds to the "recorder 1-input 4K video," which is a constituent element of the reception data group 3 (DG3) 93.

That is, the server 1, which is a transmitting apparatus, and the recorder 1, which is a receiving apparatus, transmit and receive the 4K uncompressed video via the network.

In addition, the "server 1-output compressed sound" in the transmission data group 3 (SG3) 73 corresponds to the "recorder 1-input sound," which is a constituent element of the reception data group 3 (DG3) 93.

That is, the server 1, which is a transmitting apparatus, and the recorder 1, which is a receiving apparatus, transmit and receive the compressed sound via the network.

4. About Display Information (UI) Generated by Information Processing Apparatus Next, specific examples of display information (UI) generated by the information processing apparatus (system monitoring apparatus) 20 illustrated in FIG. 1 and FIG. 3 are explained.

As has been explained above, via the network 30, the network-connected instruments 40 illustrated in FIG. 1 and FIG. 3 execute transmission and reception of various types of video data such as 4K videos, HD videos and SD videos, various languages such as Japanese sounds and English sounds, and various types of sound data such as monaural sounds, stereo sounds, and surround sounds, and various types of data that are differently formatted, and to which different codecs are applied are transmitted and received.

As has been explained with reference to FIG. 4 to FIG. 8, the information processing apparatus 20 sets a group in which such many different types of transmission/reception data are logically combined, and generates group-by-group display information.

As mentioned above, the groups include the following groups, for example.

Transmission data groups (SG: Source Groups)
Reception data groups (DG: Destination Groups)

These groups are sets of data that can be controlled collectively, for example.

The information processing apparatus (system monitoring apparatus) 20 monitors the communication data-by-communication data, apparatus-by-apparatus, and group-by-group data processing status or inter-instrument communication status at individual instruments constituting the information processing system 10 illustrated in FIG. 1, that is, the instruments 40*a* to 40*p* which are audiovisual data processing apparatuses, and the occurrence status of an error occurring in each instrument, and a communication error in an inter-instrument communication is displayed on a display unit.

The information processing apparatus 20 receives information indicating the state of each instrument (instrument information) via network-connected instruments or the system controller 21 illustrated in FIG. 3.

The instrument information includes communication information, error information or the like regarding each instrument, for example.

The communication information includes information such as transmission source information, transmission destination information, or communication data type (4K video, Japanese sound, etc.) regarding each instance of communication that is being executed, stopped or reserved.

Based on the input instrument information, the information processing apparatus 20 generates display information indicating the communication status of network-connected instruments, specifically, display information including errors of each instrument, the states of inter-instrument communication, moreover the group-by-group communication status explained with reference to FIG. 4 to FIG. 8 above, and the like.

That is, the information processing apparatus 20 generates display information that allows identification of data of inter-group communication between a transmission data group constituted by a plurality of pieces of transmission data, and a reception data group constituted by a plurality of pieces of reception data.

Specific exemplary display information (UI) is explained below with reference to FIG. 9.

Figure 9:
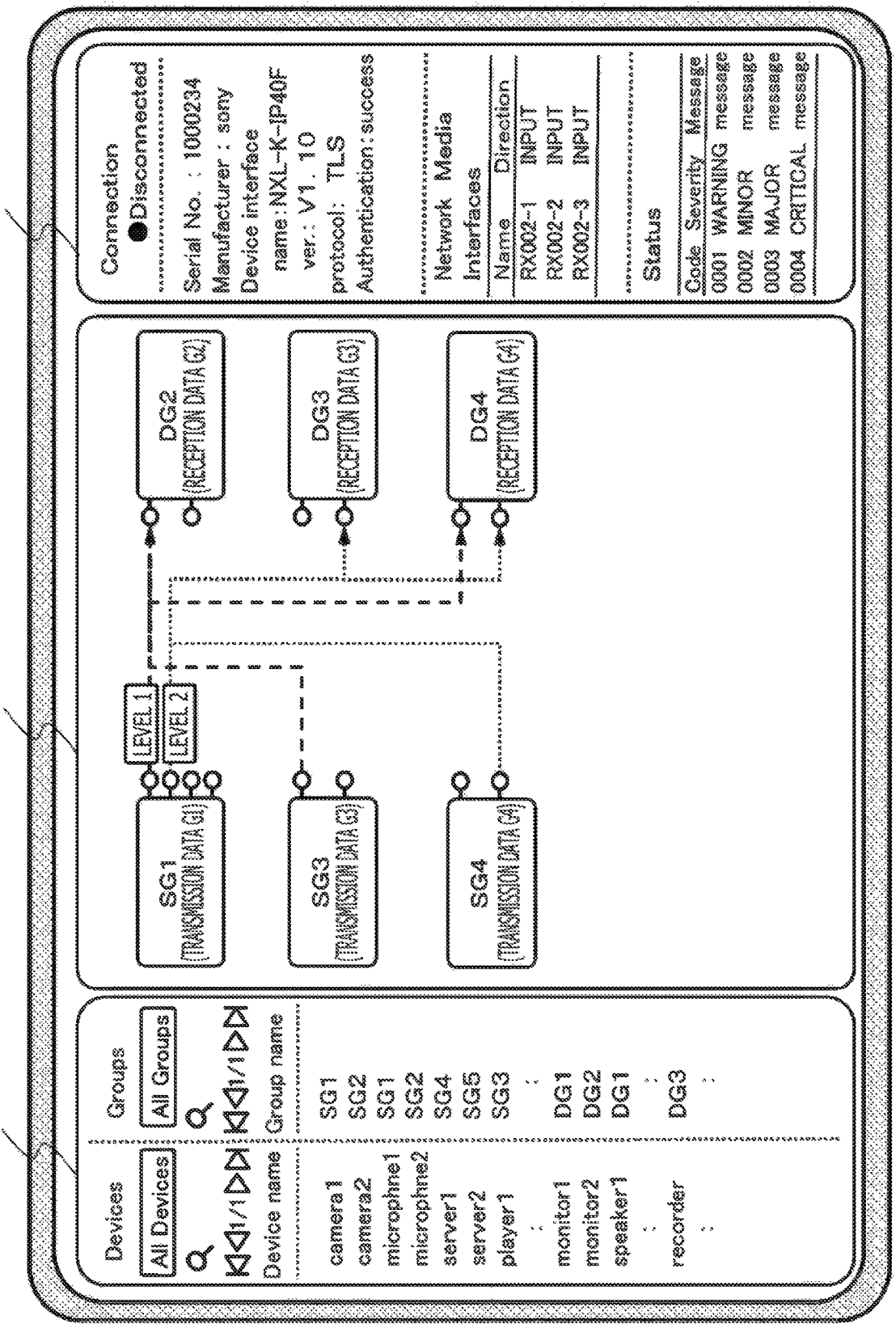
FIG. 9 is a figure for explaining an exemplary display screen of the information processing apparatus (system monitoring apparatus).

FIG. 9 is a figure illustrating exemplary display information of a display unit of the information processing apparatus 20.

The display information illustrated in FIG. 9 is constituted by three pieces of information displayed in (1) a group selection portion 110,
(2) a connection information display portion 120, and
(3) a detail information display portion 130.

The display information illustrated in FIG. 9 allows to logically group a plurality of videos, sounds and the like that are differently formatted in terms of resolution, codec, color depth and the like, and to easily check which groups are in a transmitting-receiving relation.

For example, it becomes possible to easily check in which communication data in communication data of videos and sounds associated with groups an error is occurring, and details of the error.

For example, it becomes possible to narrow down particular apparatuses (devices) connected to the network, groups or terminals for individual pieces of communication data, and to display and check detail information regarding each constituent element (group, device, and terminal), and it is possible to easily check at which portion an error is occurring, and to easily narrow down the extent of influence of the error.

For example, at a time of occurrence of an error, error information is displayed in the connection information display portion 120 illustrated in FIG. 9.

For example, if an error occurred in a particular group, group-constituting device or device terminal on the transmission side, an error message is displayed near a group icon or a terminal on the transmission side.

In addition, if an error occurred in a particular group, group-constituting device or device terminal on the reception side, an error message is displayed near a group icon or terminal on the reception side.

By displaying such an error message, it becomes possible to easily identify at which portion an error occurred.

Furthermore, a user (monitor) can select a group or flow that generated an error, from a plurality of transmission data groups or reception data groups or a plurality of communication flows between groups indicated in the connection information display portion 120 illustrated in FIG. 9. For example, a selection can be made by a click process.

By this selection process, elements that are irrelevant to the selection group or selection flow, that is, groups or flows out of the extent of influence of the error can be set to be grayed out or hidden. This display control makes it possible to immediately check the extent of influence of one error.

In addition, it is possible to display and check, in the detail information display portion 130 illustrated in FIG. 9, detail information regarding apparatuses (devices) connected to the network, groups or terminals for individual pieces of communication data, and it becomes possible to immediately check specific error contents of a group, device, or terminal in which an error occurred.

In data transmission and reception utilizing an IP network, it is difficult to determine a transmitting-receiving relation between individual pieces of data such as videos and sounds on the basis only of physical wires, but with the configuration in the present disclosure, it becomes possible to easily check the transmitting-receiving relation between individual pieces of data, and it becomes possible to surely identify an error-detected location and the extent of influence of an error.

Hereinafter, details of an "inter-group communication information display screen," which is a UI consisting of the display information illustrated in FIG. 9, that is, the three pieces of information displayed in (1) the group selection portion 110,
(2) the connection information display portion 120, and
(3) the detail information display portion 130, are explained below with reference to FIG. 10.

[4-1. About Details of Display Information of Group Selection Portion]

First, details of display information of the group selection portion 110 constituting the "inter-group communication information display screen," which is display information of the information processing apparatus 20, are explained with reference to FIG. 10.

The group selection portion 110 is an area where a list of groups is displayed, and it is made possible for a user to select one or multiple groups from the displayed group list, cause the connection information display portion 120 to display connection information related to the selected group, and cause the detail information display portion 130 to display detail information related to the selected group.

Note that the group selection portion 110 also displays a list of apparatuses (devices) connected to the network, and has the group narrow-down function of selecting an apparatus from the apparatus list and displaying a group corresponding to the selection apparatus in the group list.

In this manner, the group selection portion 110 is an area that provides a user interface (UI) for deciding information to be displayed in the connection information display portion 120 and the detail information display portion 130 group by group.

Note that, as mentioned above, the groups include the following groups.

Transmission data groups (SG: Source Groups)
Reception data groups (DG: Destination Groups)

It is possible to designate in the group selection portion 110 any one of or both the transmission data groups (SG) and the reception data groups (DG) explained above, as a group(s) to be displayed in the connection information display portion 120 and the detail information display portion 130.

In addition, in the group selection portion 110, (a) an apparatus list constituted by apparatus names (Device Name) of network-connected instruments, and (b) a group list constituted by group identifiers of transmission data groups (SGn) and reception data groups (DGn) are displayed.

It is possible to designate a particular group and designate a group corresponding to a particular apparatus by utilizing these lists.

Figure 10:
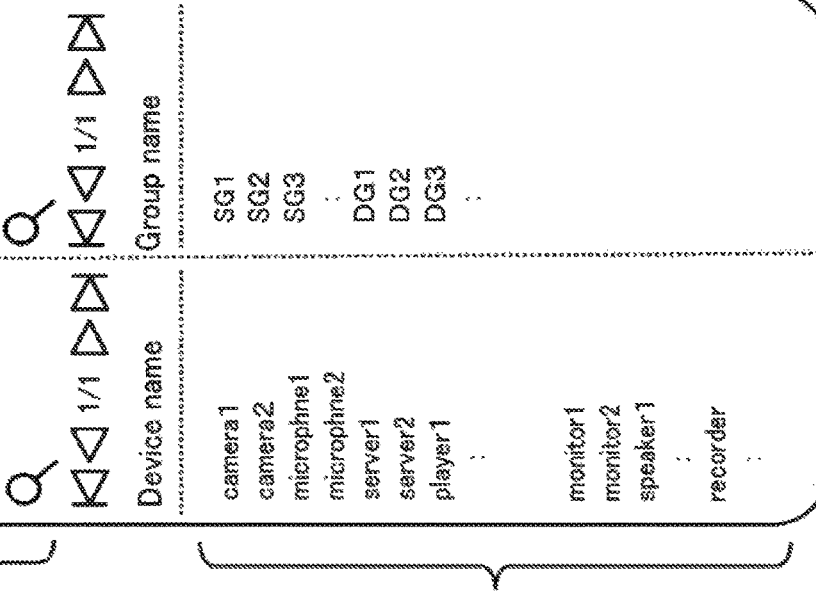
FIG. 10 is a figure for explaining an exemplary display of a group selection portion.

As illustrated in FIG. 10, the group selection portion 110 has an apparatus (device) information display area 111 illustrated on the left side, and a group information sub display area 112 illustrated on the right side.

In an upper area of the apparatus information display area 111 illustrated on the left side, an apparatus (device) search portion 113 is set, and in its lower area, an apparatus (device) list display portion 114 that displays a list of apparatuses which is a search result corresponding to the apparatus (device) search portion 113 is set.

On the other hand, in an upper area of the group information display area 112 illustrated on the right side, a group search portion 115 is set, and in its lower area, a group list display portion 116 that displays a list of group identifiers (SGn and DGn) which is a search result corresponding to the group search portion 115 is set.

For example, if a user inputs a search word such as an apparatus name in a data input portion (search word input portion) in the apparatus (device) search portion 113 and executes a search, a list of apparatuses (devices) as a search result is displayed in the apparatus (device) list display portion 114 in the lower portion.

Note that the example illustrated in FIG. 10 is an example in which "All Devices" is used as a search word to perform a search, and as a result of this search, a list of the apparatus names (device names) of the all apparatuses (devices) connected to the network is displayed in the apparatus list display portion 114.

In addition, for example, if a user inputs, as a search word, (SG) which is a constituent element of group identifiers common to all the transmission data groups in a data input portion (search word input portion) in the group search portion 115 and executes a search, a list of all the group identifiers (SG1 to SGn) of transmission data groups set for the current system is displayed as a search result in the group list display portion 114 in the lower portion.

Note that the example illustrated in the figure is an example in which "All Groups" is used as a search word to perform a search, and as a result of this search, a list of all the group identifiers set for the information processing system 10 is displayed in the group list display portion 116.

Furthermore, by a user selecting (clicking) an apparatus name (device name) displayed in the apparatus list display portion 114, only a group identifier of a transmission data group (SGn) or a reception data group (DGn) to which transmission data of the selection apparatus belongs can be caused to be displayed in the group list display portion 116.

That is, it is possible to narrow down groups on the basis of apparatuses, displaying only groups corresponding to particular apparatuses in the group list display portion 116.

Furthermore, by a user selecting (clicking) a particular group identifier among group identifiers displayed in the group list display portion 116, connection information related to the selected group is displayed in the connection information display portion 120, and additionally detail information related to the selection apparatus or selection group is displayed in the detail information display portion 130.

Note that in another search processing mode utilizing the apparatus (device) search portion 113 and group search portion 115, other than searches that are based on designation of an apparatus name, group name or group identifier, or designation of some of them, it is also possible to cause only an apparatus or group in which an error in occurring to be displayed in a list by performing a search that is based on designation of [error] as a search word, for example.

[4-2. About Details of Display Information of Connection Information Display Portion]

Next, details of display information in the connection information display portion 120 are explained with reference to FIG. 11.

In the connection information display portion 120, connection information of a group selected by a user in the group selection portion 110 explained with reference to FIG. 10 above is displayed.

Figure 11:
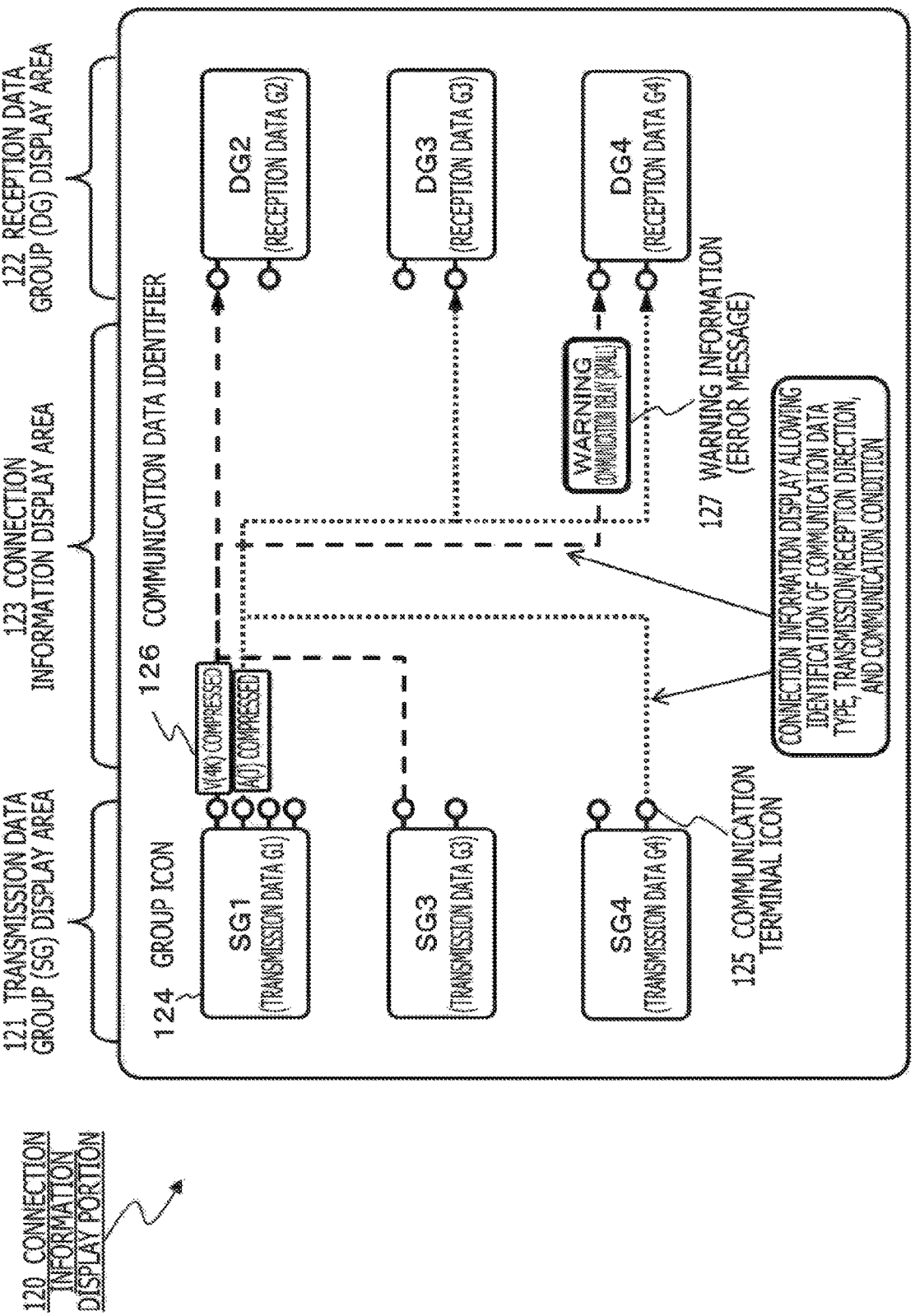
FIG. 11 is a figure for explaining an exemplary display of a connection information display portion.

A specific example of the display information in the connection information display portion 120 is illustrated in FIG. 11.

As illustrated in FIG. 11, the connection information display portion 120 is constituted by display areas, a transmission data group (SG) display area 121, a reception data group (DG) display area 122, and a connection information display area 123.

In the transmission data group display area 121, transmission data groups (SG) are displayed group by group.

In the reception data group display area 122, reception data groups (DG) are displayed group by group.

Each group icon 124 indicates a group unit.

As mentioned above, these groups are each a group for which collective control, specifically, processes of starting and stopping data transmission and reception, can be executed collectively.

Each of the transmission data groups (SG) displayed in the transmission data group display area 121 and the reception data groups (DG) displayed in the reception data group display area 122 has communication terminal icons 125 displayed therewith for each type of communication data.

The communication data is "4K compressed video," "Japanese sound," and the like, for example.

In the connection information display area 123, the communication data-by-communication data communication status included in each group is displayed.

In the connection information display area 123, lines linking communication terminal icons set for the transmission data groups (SG) and communication terminal icons set for the reception data groups (DG) indicate the status of communication between terminals of individual groups.

Note that although illustrated lines linking communication terminal icons are dotted lines in FIG. 11, these dotted lines illustrate states where actual communication is not being performed. That is, they illustrate a state where communication is being prepared or a state where communication is stopped.

Figure 12:
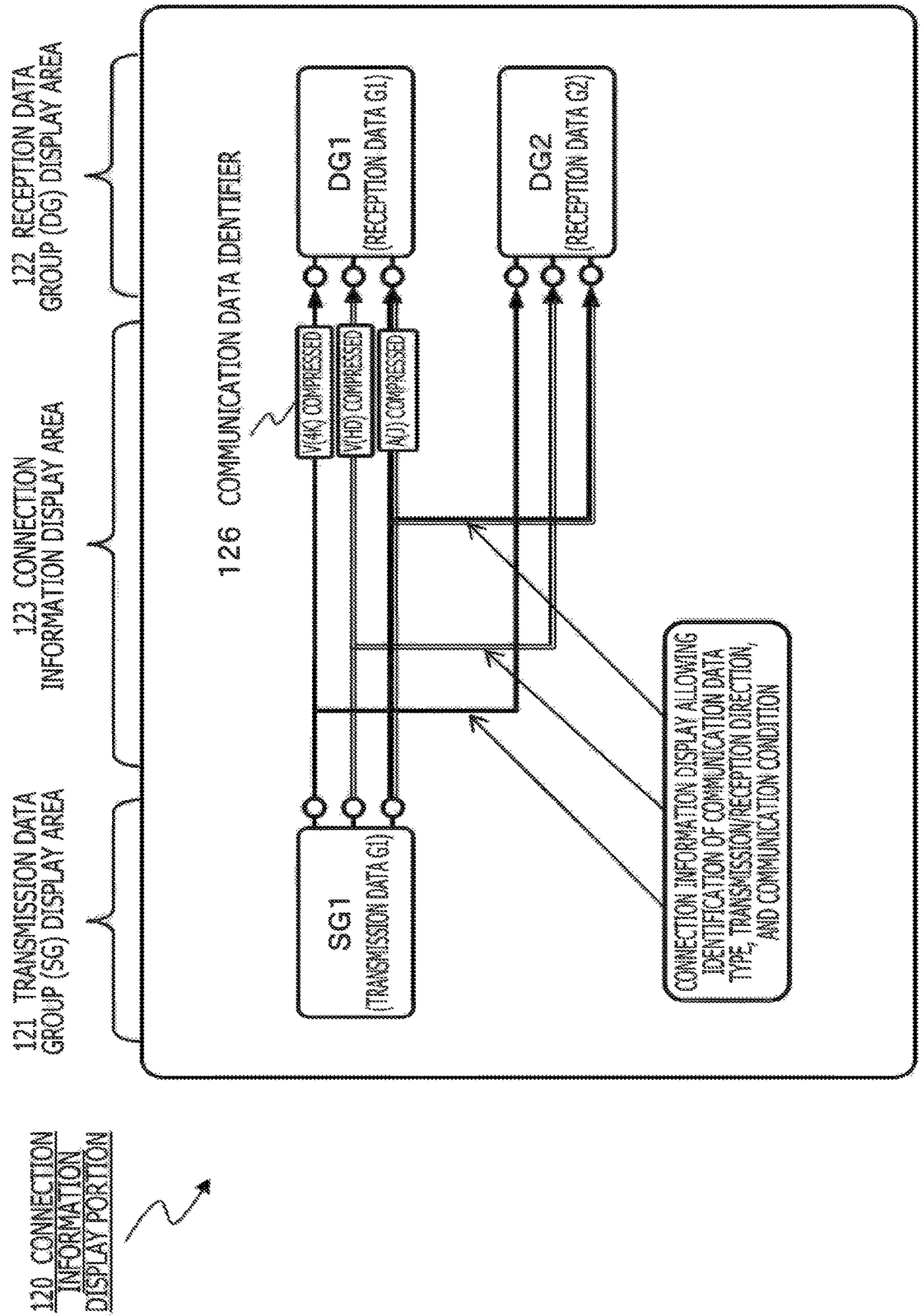
FIG. 12 is a figure for explaining an exemplary display of the connection information display portion.

In a state where communication is being performed, displayed lines linking communication terminal icons are solid lines as illustrated in FIG. 12, for example.

The connection lines displayed in the connection information display area 123 are displayed as lines that are set to allow identification of communication data types, transmission and reception directions, and communication states.

Specifically, the modes of display of connection lines are altered between different colors, thicknesses, and the like depending on communication data types.

In addition, arrows indicated by the directions of data communication are displayed.

In addition, about communication states, a solid line is displayed when communication is being executed, and a dotted line is displayed in a communication-non-executed state.

Note that, as illustrated in FIG. 11, a communication data identifier 126 associated with each connection line is displayed, thereby allowing identification of a communication data type.

[V(4K) compressed] means compressed data of a 4K video.

[A(J) compressed] means compressed data of a Japanese sound.

Furthermore, if some problem, that is, some error, is detected in a communication line indicated by each connection line, warning information (error message) 127 corresponding to the error state is displayed in the connection information display area 123. In the figure, [WARNING communication delay (small)] is illustrated as one example of warning information (error message).

The warning information (error message) 127 is displayed on a connection line where an error is occurring. In addition, the warning information (error message) 127 is displayed near a terminal on the side of an instrument that output an error report. That is, the warning information (error message) 127 is displayed near a terminal corresponding to an instrument that is in a transmission data group or a reception data group and that output an error report.

As will be explained below, for example, by a user (monitor) designating (clicking) a terminal icon close to the display position of the warning information (error message) 127, detail information related to the terminal is displayed in the detail information display portion 130, thereby allowing checking of details of the error.

Specific examples of communication data identifiers, modes of connection lines, and moreover warning messages displayed in the connection information display area 123 are explained with reference to FIG. 13 and FIG. 14.

First, specific examples of communication data identifiers and connection lines displayed in the connection information display area 123 are explained with reference to FIG. 13.

As specific examples of some of communication data identifiers and connection lines displayed in the connection information display area 123, FIG. 13 illustrates (A) communication data identifiers, and (B) connection line display modes according to communication states, for the following four types of communication data.

(1) 4K compressed video
(2) 4K uncompressed video
(3) HD compressed video
(4) Japanese compressed sound For example, if the communication data is (1) 4K compressed video:

(A) the communication data identifier is "V(4K) compressed"; and (B) the connection line display mode according to the communication state is a black solid line display in a communication-executed state, and a black dotted line display in a communication-non-executed state.

Note that connection lines are set to have arrows indicating directions from transmission sources to transmission destinations. The same applies also in the following explanations.

In addition, if the communication data is (2) 4K uncompressed video:

(A) the communication data identifier is "V(4K) uncompressed"; and (B) the connection line display mode according to the communication state is a red solid line display in a communication-executed state, and a red dotted line display in a communication-non-executed state.

In addition, if the communication data is (3) HD compressed video:

(A) the communication data identifier is "V(HD) compressed"; and (B) the connection line display mode according to the communication state is a blue solid line display in a communication-executed state, and a blue dotted line display in a communication-non-executed state.

In addition, if the communication data is (4) a Japanese compressed sound:

(A) the communication data identifier is "A(J) compressed"; and (B) the connection line display mode according to the communication state is a green solid line display in a communication-executed state, and a green dotted line display in a communication-non-executed state.

Note that the example illustrated in FIG. 13 is one example, and various display modes other than these settings are available.

It should be noted that, however, in principle the type of each piece of the communication data, the communication state, and the communication direction are identifiable in any setting.

Next, specific examples of the warning information (error message) 127 displayed in the connection information display area 123 are explained with reference to FIG. 14.

FIG. 14 illustrates (A) error level identifiers and (B) error message display modes about the following four types of exemplary errors:

(1) communication delay (small)
(2) communication delay (large)
(3) packet loss
(4) communication stopped The severity of an error increases in the order from (1) to (4).

Note that the exemplary errors illustrated in FIG. 14 are example, and there are many errors other than them. Each error is associated with multiple error levels that indicate the error severity depending on error contents.

For example, if the error is (1) communication delay (small),
(A) the error level identifier is "WARNING," and
(B) the error message display mode is set to:
[WARNING communication delay (small)].
The message explained above is displayed in blue on a connection line where the error is occurring.

Note that, as mentioned above, the warning information (error message) 127 illustrated in FIG. 11 is displayed on a connection line where the error is occurring and near a terminal on the side of an error-detected instrument that output an error report. That is, the warning information (error message) 127 is displayed near a terminal corresponding to an instrument that is in a transmission data group or a reception data group and that output an error report. By a user (monitor) designating (clicking) a terminal icon close to the display position of the warning information (error message) 127, detail information related to the terminal is displayed in the detail information display portion 130, thereby allowing checking of details of the error.

In addition, if the error is (2) communication delay (large),
(A) the error level identifier is "MINOR," and
(B) the error message display mode is set to:
[MINOR communication delay (large)].
The message explained above is displayed in green on a connection line where the error is occurring.

In addition, if the error is (3) packet loss,
(A) the error level identifier is "MAJOR," and
(B) the error message display mode is set to:
[MAJOR packet loss].
The message explained above is displayed in yellow on a connection line where the error is occurring.

In addition, if the error is (4) communication stopped,
(A) the error level identifier is "CRITICAL," and
(B) the error message display mode is set to:
[CRITICAL communication stopped].
The message explained above is displayed in red on a connection line where the error is occurring.

Note that this example illustrated in FIG. 14 is one example, and various display modes other than these settings are available.

It should be noted that, however, in principle the error level indicating the severity of each error, and specific contents of the error are identifiable in any setting.

[4-3. About Details of Display Information of Detail Information Display Portion]

Next, details of display information of the detail information display portion 130 constituting display information of the information processing apparatus 20 are explained.

The detail information display portion 130 can display detail information in the following three different types of unit, for example.
(a) Apparatus (device) detail information
(b) Group detail information
(c) Terminal detail information A user can designate which detail information among (a) to (c) explained above is displayed in the detail information display portion 133.

Figure 15:
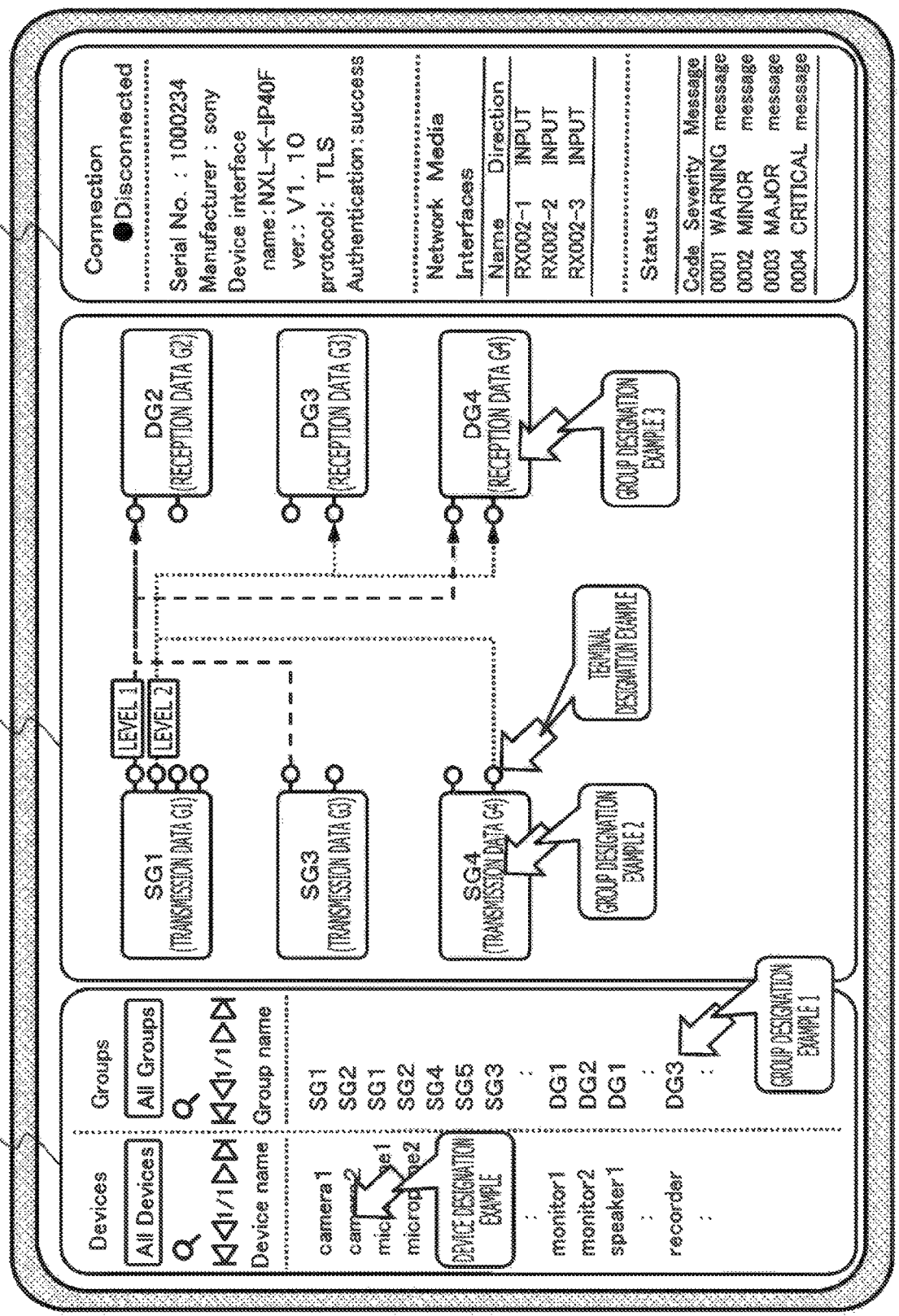
FIG. 15 is a figure for explaining a process of selecting detail information displayed in a detail information display portion.

FIG. 15 is a figure illustrating an exemplary process of designation by a user about which detail information among (a) to (c) explained above is displayed in the detail information display portion 130.

FIG. 15 is a figure illustrating an exemplary display of a display screen of the information processing apparatus (system monitoring apparatus) 20 similar to the one explained with reference to FIG. 9 above.

The display information illustrated in FIG. 15 is constituted by three pieces of information displayed in
(1) the group selection portion 110,
(2) the connection information display portion 120, and
(3) the detail information display portion 130.

Information displayed in the detail information display portion 130 can be switched by designating (clicking) data displayed in the group selection portion 110 or connection information display portion 120, for example.

For example, as illustrated as "device designation example" in FIG. 15, detail information regarding a selected apparatus (device) is displayed in the detail information display portion 130 by selecting (clicking) one apparatus (device) name [camera2, etc.] or the like from apparatus (device) names displayed in an apparatus (device) list display portion in the group selection portion 110.

In addition, as illustrated as "group designation example 1" in FIG. 15, detail information regarding a selected group is displayed in the detail information display portion 130 by selecting (clicking) one group name [DG3, etc.] from group names displayed in a group list display portion in the group selection portion 110.

In addition, as illustrated as "group designation example 2" and "group designation example 3" in FIG. 15, detail information regarding selected groups is displayed in the detail information display portion 130 by selecting (clicking) group icons [SG4, DG4, etc.] indicating groups displayed in the connection information display portion 120.

In addition, as illustrated as "terminal designation example" in FIG. 15, detail information regarding a selected terminal is displayed in the detail information display portion 133 by selecting (clicking) a terminal icon indicating a terminal displayed in the connection information display portion 120.

Next, the following three types of detail information displayed in the detail information display portion 130 are explained in order below with reference to FIG. 16.
(a) Apparatus (device) detail information
(b) Group detail information
(c) Terminal detail information First, details of (a) apparatus (device) detail information displayed in the detail information display portion 130 are explained with reference to FIG. 16.

(a) Apparatus (device) detail information is instrument-by-instrument detail information, and, for example, includes apparatus-by-apparatus (device-by-device) error detail information.

Figure 16:
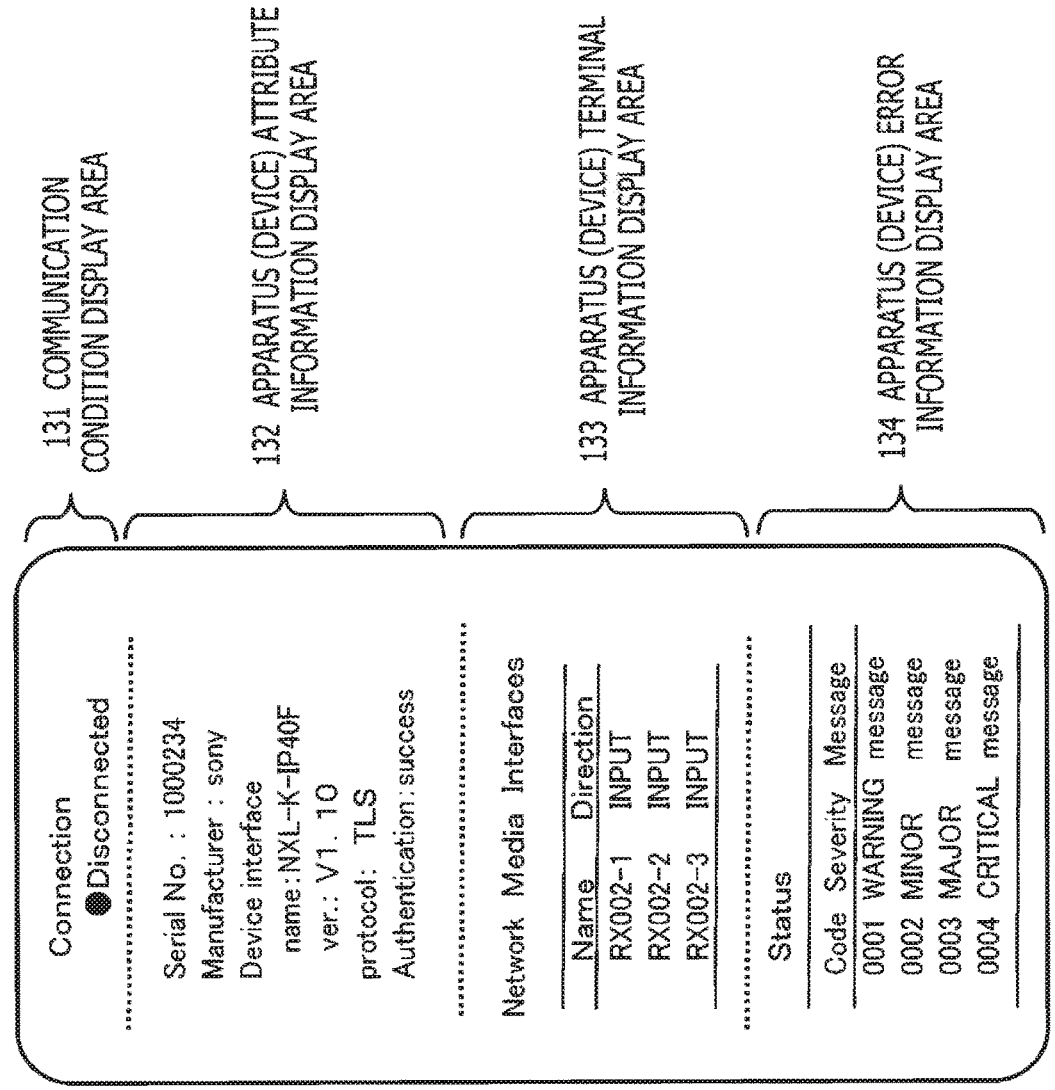
FIG. 16 is a figure for explaining exemplary details of display data of the detail information display portion.

If (a) apparatus (device) detail information is displayed in the detail information display portion 130, the apparatus (device) detail information is constituted by the following individual display areas as illustrated in FIG. 16:
(a1) communication state display area 131;
(a2) apparatus (device) attribute information display area 132;
(a3) apparatus (device) terminal information display area 133; and
(a4) apparatus (device) error information display area 134

The communication state of this apparatus (device) is displayed in (a1) communication state display area 131.

Either communication being executed (Connected) is displayed in a communication-executed state, or communication being stopped (Disconnected) is displayed in a communication-stopped state.

Attribute information of an apparatus (device) is displayed in (a2) apparatus (device) attribute information display area 132.

For example, the attribute information includes the serial number of the apparatus (device), the manufacturer of the apparatus (device), the interface information of the apparatus (device), protocol, verification information and the like.

Terminal information for data communication of an apparatus (device) is displayed in (a3) apparatus (device) terminal information display area 133.

For example, the terminal name (Name) of a terminal provided to an apparatus (device), and the direction information (Direction) which is input/output information of communication data are displayed in association with each other.

[INPUT] indicates that it is a data input terminal, and [OUTPUT] indicates that it is a data output terminal.

Note that each terminal is set communication data by communication data. It should be noted that, however, the terminal needs not be set as a physical configuration for the device, but may be a virtual configuration, that is, a virtual terminal for distinguishing between input and output units corresponding to communication data.

Note that the display of the detail information display portion 130 can be switched to detail information regarding a selected terminal by designating (clicking) the terminal name (Name) displayed in this apparatus (device) terminal information display area 133.

Error information of an apparatus (device) is displayed in (a4) apparatus (device) error information display area 134.

About a communication error of transmission/reception data input and output to and from the apparatus (device) or an error occurring inside the apparatus (device), the severity indicating the error level, and a message indicating the error status are displayed.

As the severity indicating the error level, four types of levels, WARNING, MINOR, MAJOR and CRITICAL, are displayed according to error contents, similar to the warning information explained with reference to FIG. 14 above.

Information indicating specific error contents is displayed in the message display area.

Next, details of (b) group detail information displayed in the detail information display portion 130 are explained with reference to FIG. 17.

(b) Group detail information is group-by-group detail information regarding any one of transmission data groups and reception data groups. The group detail information includes detail information regarding communication data included in a group.

Figure 17:
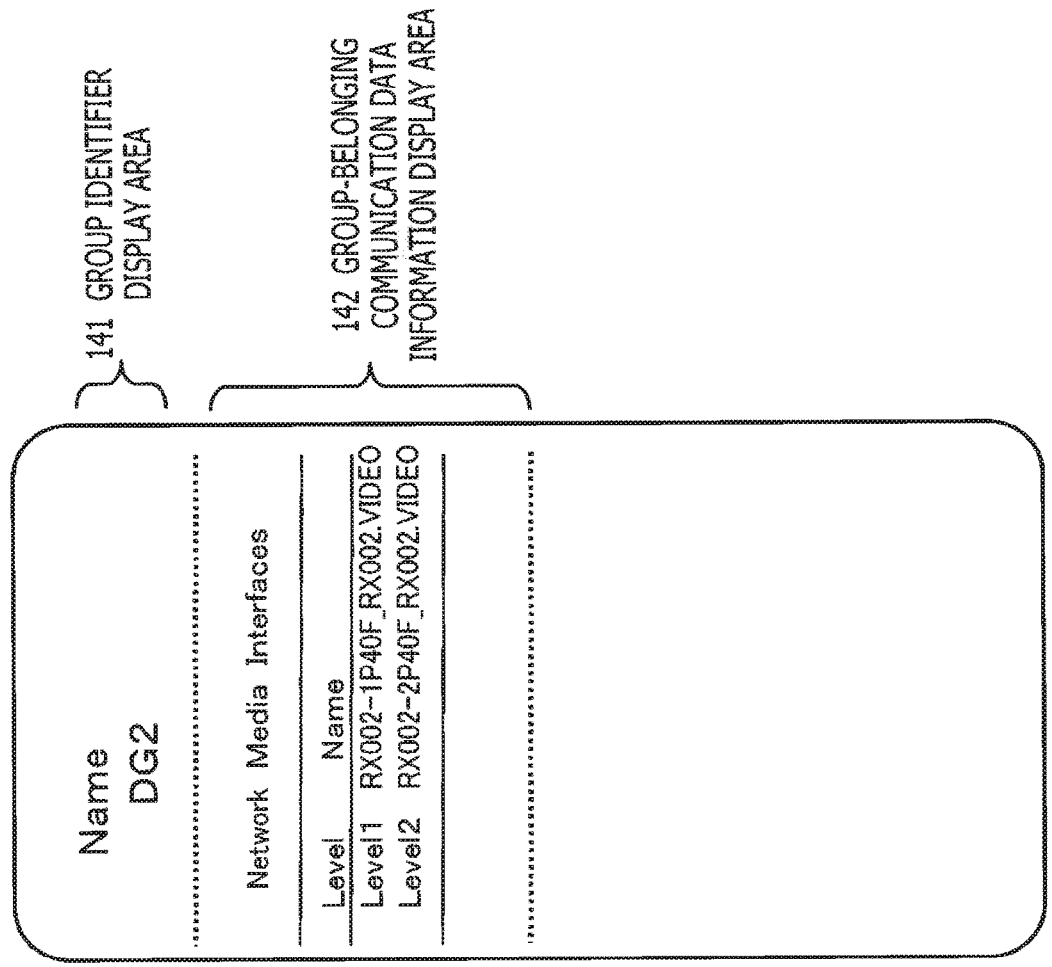
FIG. 17 is a figure for explaining exemplary details of display data of the detail information display portion.

If (b) group detail information is displayed in the detail information display portion 130, the group detail information is constituted by the following individual display areas as illustrated in FIG. 17.

(b1) group identifier display area 141, and
(b2) group-belonging communication data display area 142

A group identifier is displayed in (b1) group identifier display area 141.

Note that, as mentioned above, the group is any one of
Transmission data groups (SG: Source Groups)
Reception data groups (DG: Destination Groups).

Information regarding communication data belonging to this group is displayed in (b2) group-belonging communication data display area 142.

The level (Level) is data indicating communication hierarchy, and if there is only one instance of communication belonging to the group, only Level1 is set, and if there are two instances of communication belonging to the group, two levels, Level1 and Level2, are set. Thereafter, the number of levels corresponding to the number of instances of communication is set.

The name (Name) indicates details of communication data, and, for example, information that allows identification of specific data types, formats or codecs such as communication of a 4K video uncompressed data or communication of sound compressed data is displayed.

Note that in another possible configuration, other than data illustrated in FIG. 17, a list of errors of terminals registered in a group may be displayed, for example.

Next, details of (c) terminal detail information displayed in the detail information display portion 130 is explained with reference to FIG. 18.

(c) Terminal detail information is unit-by-unit detail information regarding transmitting units or receiving units for each piece of communication data of transmission data or reception data in data communicated between network-connected instruments.

The terminal detail information includes terminal error detail information which is unit-by-unit error information regarding transmitting units or receiving units for each piece of communication data.

Figure 18:
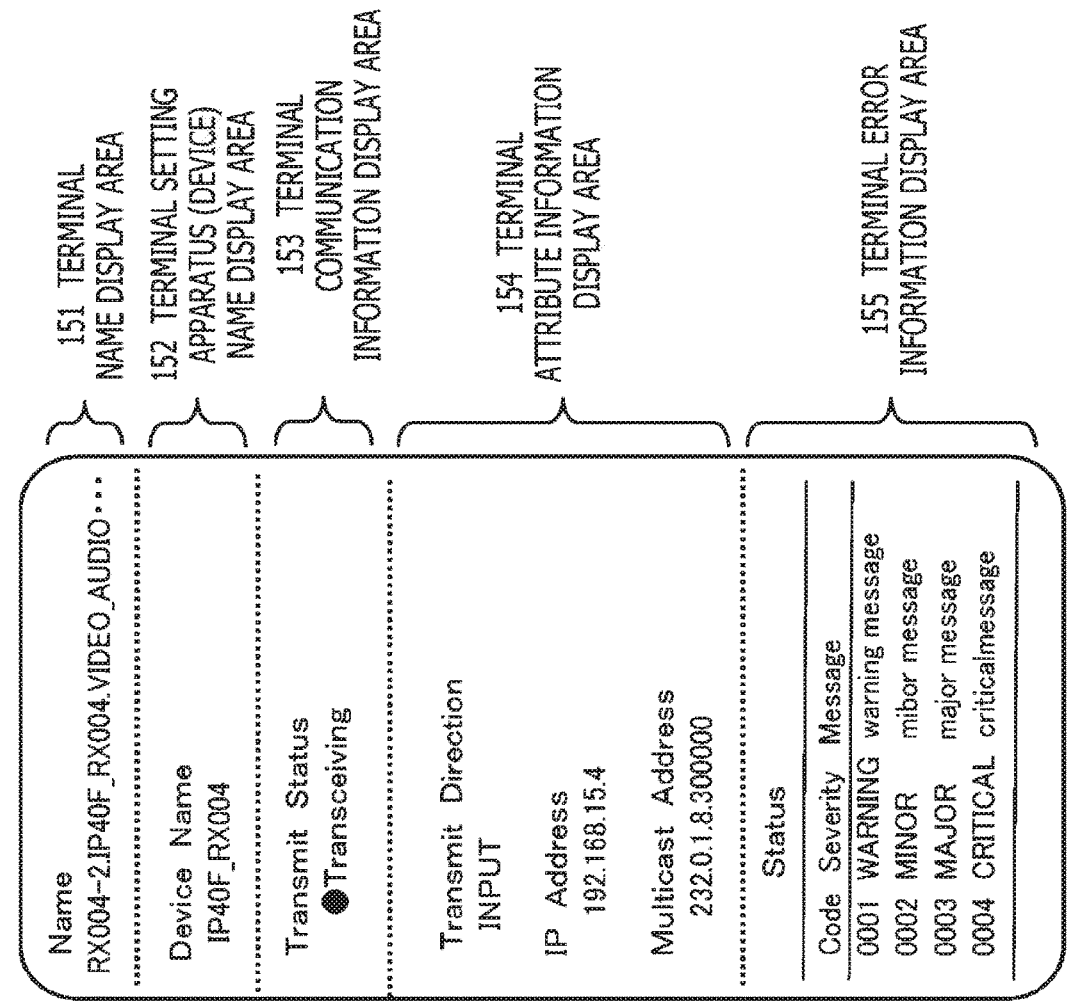
FIG. 18 is a figure for explaining exemplary details of display data of the detail information display portion.

If (c) terminal detail information is displayed in the detail information display portion 130, the apparatus (device) detail information is constituted by the following individual display areas as illustrated in FIG. 18:

(c1) terminal name display area 151;
(c2) terminal setting apparatus (device) name display area 152;
(c3) terminal communication information display area 153;
(c4) terminal attribute information display area 154; and
(c5) terminal error information display area 155

The name of this terminal is displayed in (c1) terminal name display area 151.

The apparatus (device) name set for this terminal is display in (c2) terminal setting apparatus (device) name display area 152.

Information indicating the state of execution of communication through this terminal is displayed in (c3) terminal communication information display area 153.

Attribute information of the terminal is displayed in (c4) terminal attribute information display area 154.

For example, information such as information indicating whether the communication through the terminal is data input (INPUT) or data output (OUTPUT), an IP address, and a multicast address is displayed.

Error information related to communication through the terminal is displayed in (c5) terminal error information display area 155.

About an error related to the terminal, the code corresponding to the error contents, the error level, and the message indicating the error status are displayed.

As the error level, four types of levels, WARNING, MINOR, MAJOR and CRITICAL, are displayed according to error contents, similar to the warning information explained with reference to FIG. 14 above.

Information indicating specific error contents is displayed in the message display area.

As has been explained above, the concession method processing apparatus (system monitoring apparatus) 20 of the present disclosure displays the display information illustrated in FIG. 9, that is, three pieces of information displayed in (1) the group selection portion 110,
(2) the connection information display portion 120, and
(3) the detail information display portion 130.

As mentioned above, this display information allows to logically group a plurality of videos, sounds or the like that are differently formatted in terms of resolutions, codecs, color depths or the like, and to easily check which groups are in a transmitting-receiving relation, thereby making it possible to easily check in which communication data in communication data of videos and sounds associated with groups an error is occurring or details of the error.

In addition, it is possible to narrow down particular apparatuses (devices) connected to the network, groups, or terminals for individual pieces of communication data, and to display and check detail information regarding each constituent element (group, device, and terminal), and it is possible to easily check at which portion an error is occurring, and to easily narrow down the extent of influence of the error.

5. About Exemplary Transition of Display Information of Information Processing Apparatus (System Monitoring Apparatus)

Next, an exemplary transition of display information of the information processing apparatus (system monitoring apparatus) is explained.

On the display unit of the information processing apparatus (system monitoring apparatus) 20 that monitors the communication status of the network or the like, the inter-group communication information display screen which is a UI consisting of the display information explained with reference to FIG. 9 above, that is, three pieces of information displayed in (1) the group selection portion 110,
(2) the connection information display portion 120, and
(3) the detail information display portion 130 is displayed.

The process of displaying the inter-group communication information display screen (UI) constituted by these three pieces of information may be configured to be performed at any time continuously, but it may be configured to be performed in a switching manner with other various types of display information.

Figure 19:
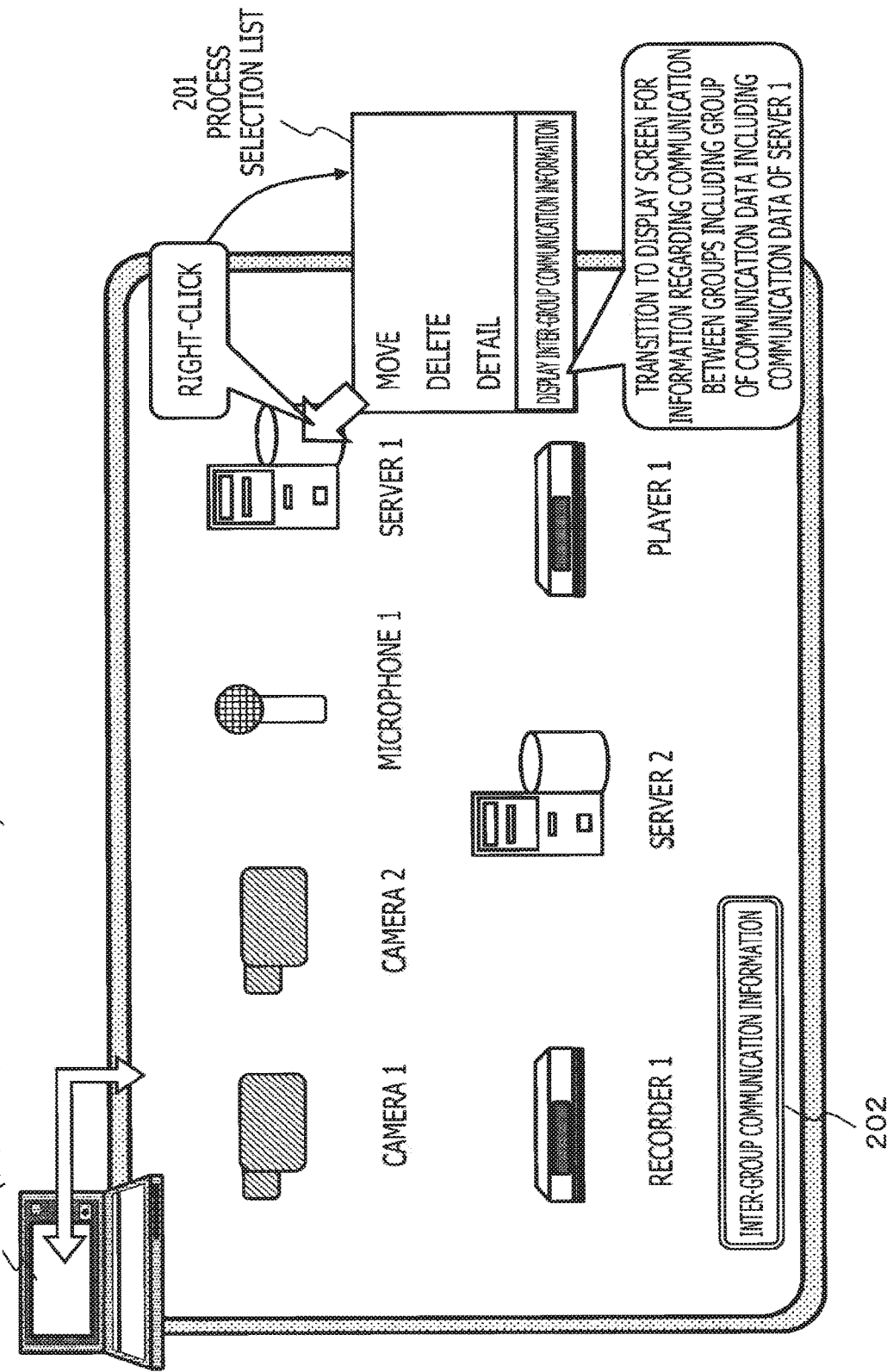
FIG. 19 is a figure for explaining exemplary display information and a display information transition process of the information processing apparatus (system monitoring apparatus).

For example, in a possible configuration, as illustrated in FIG. 19, a page indicating a list of apparatuses (devices) connected to the network 30 is displayed, and a particular apparatus (device) is selected on this page, such that the display is switched to a display of the inter-group communication information display screen (UI) illustrated in FIG. 9 consisting of a group, connection information, and the like related to the selected apparatus (device).

For example, in the example illustrated in FIG. 19, by a user selecting the server 1 from the device list, and right-clicking it, a process selection list 201 illustrated in the figure is displayed.

Furthermore, the user selects and clicks "display inter-group communication information" in the process selection list 201.

With this process, the inter-group communication information display screen consisting of three pieces of information displayed in (1) the group selection portion 110,
(2) the connection information display portion 120, and
(3) the detail information display portion 130 illustrated in FIG. 9 explained above is displayed.

Alternatively, in a possible configuration, a manipulation icon 202 for causing a transition to the inter-group communication information display screen like the one illustrated at a lower left portion of the device list illustrated in FIG. 19 is displayed, and clicked, and thereby a transition is caused to the inter-group communication information display screen.

Figure 20:
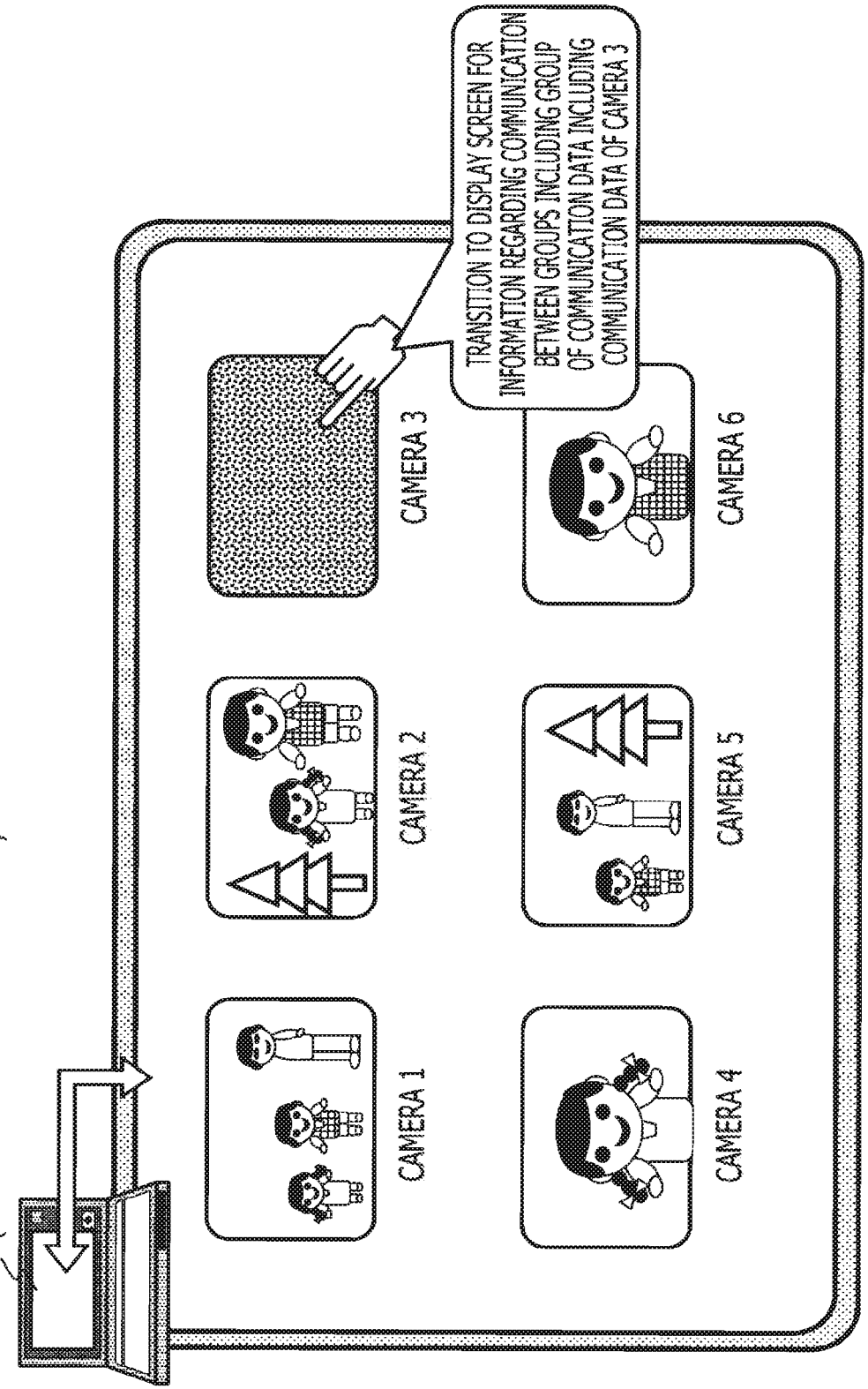
FIG. 20 is a figure for explaining exemplary display information and a display information transition process of the information processing apparatus (system monitoring apparatus).

In addition, in a possible setting, as illustrated in FIG. 20, on the display unit of the information processing apparatus (system monitoring apparatus) 20, a Multiviewer screen on which one can look through images captured by a number of cameras connected to the network 30 is displayed, and a transition is caused from this screen to the inter-group communication information display screen illustrated in FIG. 9.

For example, if a video of a camera 3 illustrated in FIG. 20 is not displayed, and a user (monitor) determines that some error might be occurring, the video area of the camera 3 is selected (clicked).

This selection (click) process causes a transition to the inter-group communication information display screen for a communication data group including transmission and reception data of the camera 3.

Note that, other than the case where a video of the camera 3 is not displayed as illustrated in FIG. 20, for example, in a possible configuration, an error message indicating an occurrence of an error is displayed in the video area of the camera 3, the error message display area is selected (clicked), such that a transition is caused to the inter-group communication information display screen of the communication data group including transmission and reception data of the camera 3 in which an error occurred.

6. About Exemplary Configuration of Information Processing Apparatus

Next, an exemplary hardware configuration of the information processing apparatus (system monitoring apparatus) 20 illustrated in FIG. 1 and FIG. 3, and an information processing apparatus that can be applied as the system controller 21 illustrated in FIG. 3 is explained with reference to FIG. 21.

Figure 21:
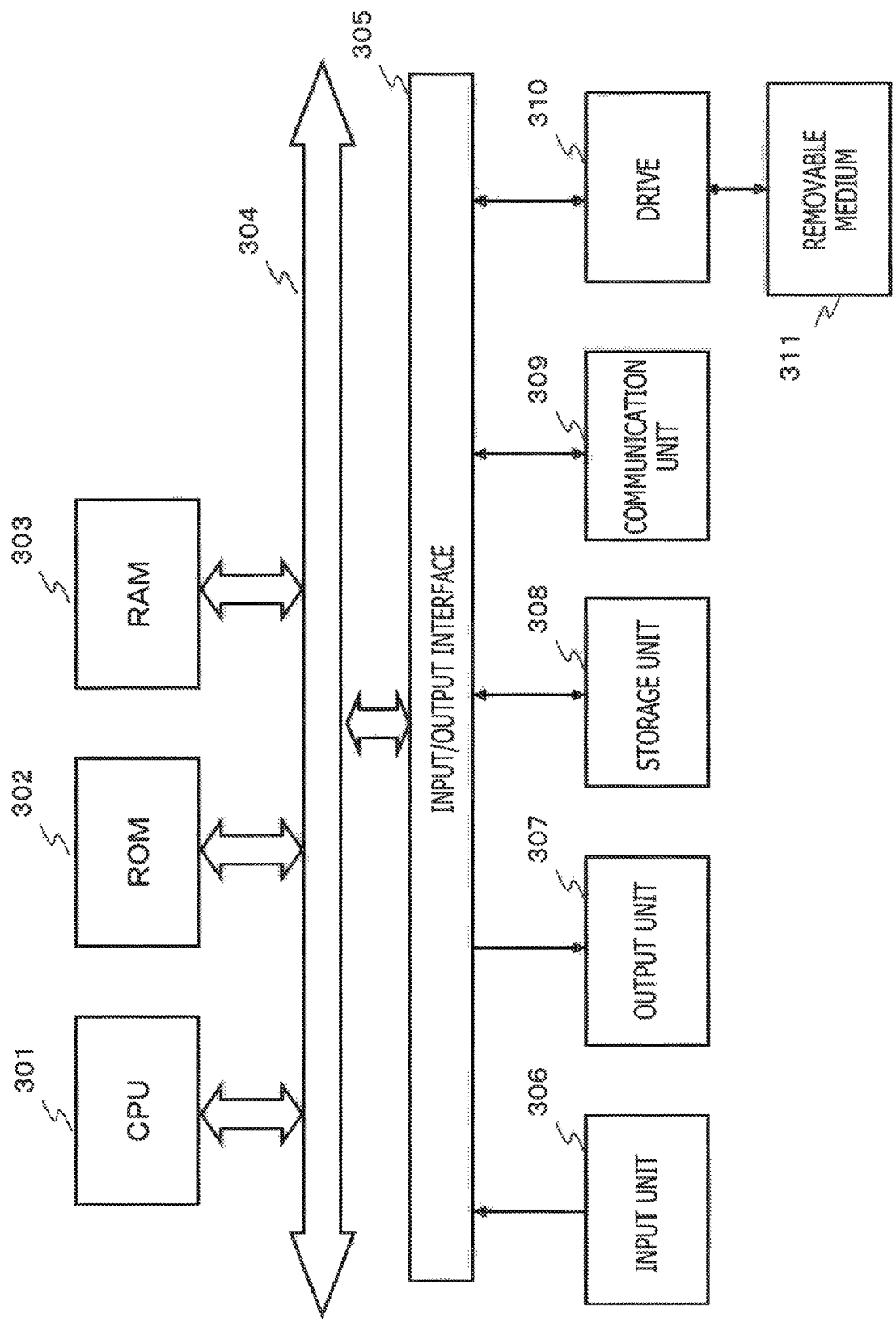
FIG. 21 is a figure for explaining an exemplary hardware configuration of a report processing apparatus applied to processes of the present disclosure.

The information processing apparatus has a hardware configuration illustrated in FIG. 21, for example. A CPU (Central Processing Unit) 301 functions as a data processing unit that execute various types of processing according to a program stored in a ROM (Read Only Memory) 302 or a storage unit 308. For example, the information processing apparatus executes the error information collection process, analysis process, display screen generation process, and the like explained in the embodiment mentioned above.

A RAM (Random Access Memory) 303 stores a program to be executed by the CPU 301, data or the like. These CPU 301, ROM 302, and RAM 303 are interconnected by a bus 304.

The CPU 301 is connected to an input/output interface 305 via the bus 304, and the input/output interface 305 is connected with an input unit 306 consisting of various types of switches, a keyboard, a touch panel, a mouse, a microphone, and the like, and an output unit 307 consisting of a display, a speaker, and the like.

The CPU 301 executes various types of processing based on an instruction or the like input from the input unit 306, and outputs a result of the processing to the output unit 307, for example.

The storage unit 308 connected to the input/output interface 305 consists of a hard disk and the like, for example, and stores a program to be executed by the CPU 301 and various types of data. A communication unit 309 functions as a transmitting and receiving unit in data communication through a network such as the internet or a local area network, and communicates with external apparatuses.

A drive 310 connected to the input/output interface 305 drives a removable medium 311 which is a magnetic disk, an optical disk, a magnetooptical disk, a semiconductor memory such as a memory card, or the like, and executes recording or read-out of data.

7. Application Examples

The technology according to the present disclosure can be applied to various products. For example, the technology according to the present disclosure may be applied to an operating room system.

Figure 22:
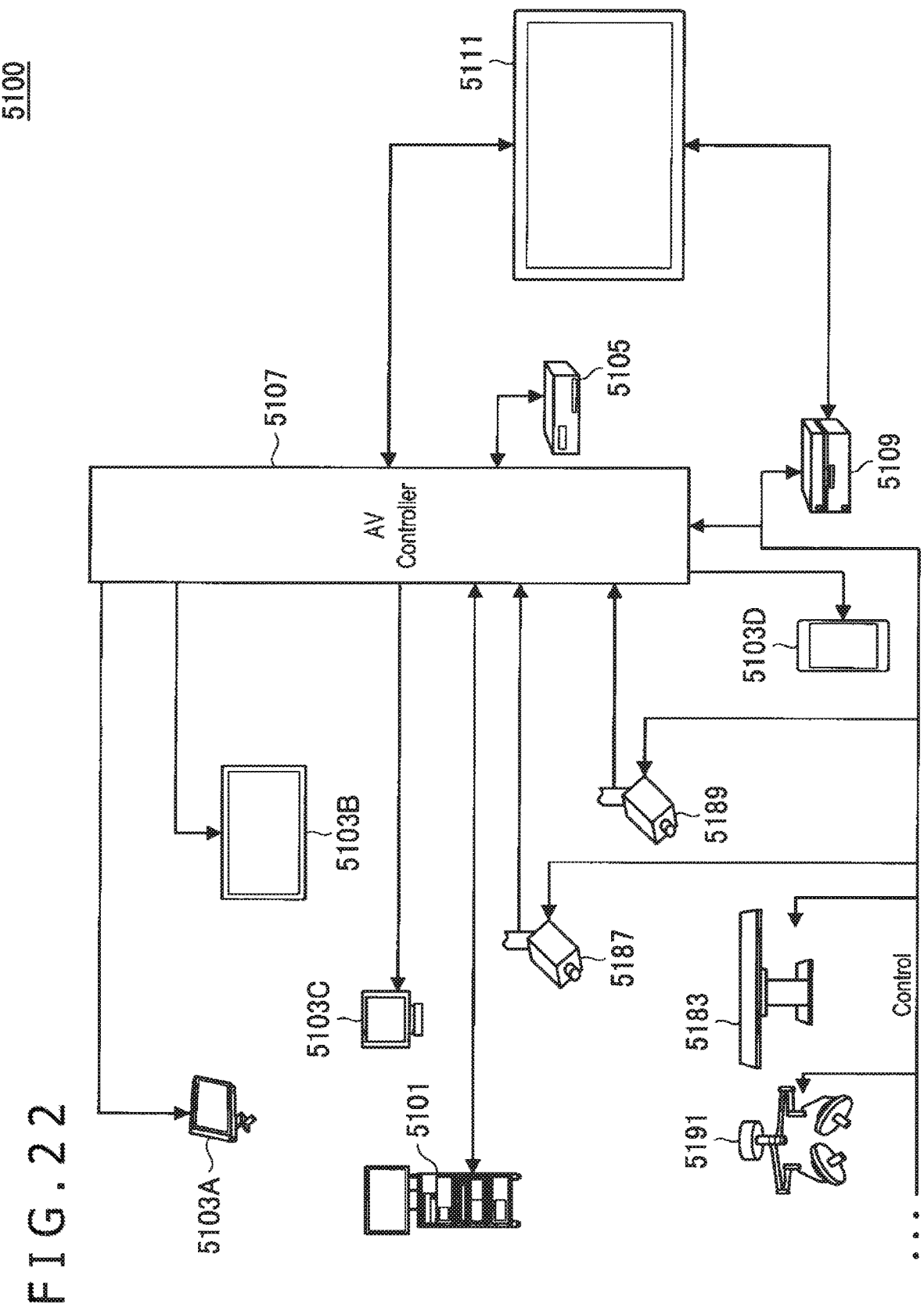
FIG. 22 is a figure schematically illustrating an overall configuration of an operating room system.

FIG. 22 is a figure schematically illustrating the overall configuration of an operating room system 5100 to which the technology according to the present disclosure can be applied. As can be seen by referring to FIG. 22, the operating room system 5100 is configured by apparatus groups installed in an operating room being connected such that they can operate in cooperation with each other via an audiovisual controller (AV Controller) 5107 and an operation room control apparatus 5109.

Various apparatuses can be installed in the operating room. For example, FIG. 22 illustrates an apparatus group 5101 including various types of apparatuses for endoscopic surgery, a ceiling camera 5187 that is provided on the ceiling of the operating room and captures the area around the hands of a surgical operator, a surgical camera 5189 that is provided on the ceiling of the operating room and captures images representing how the entire operating room appears, a plurality of display apparatuses 5103A to 5103D, a recorder 5105, a patient bed 5183, and a lighting system 5191.

Here, among these apparatuses, the apparatus group 5101 belongs to an endoscopic surgery system 5113 mentioned below, and consists of an endoscope, a display apparatus that displays images captured by the endoscope, and the like. Each apparatus belonging to the endoscopic surgery system 5113 is also called a medical instrument. On the other hand, the display apparatuses 5103A to 5103D, the recorder 5105, the patient bed 5183, and the lighting system 5191 are apparatuses that are installed in the operating room, for example, separately from the endoscopic surgery system 5113. These individual apparatuses not belonging to the endoscopic surgery system 5113 are also called non-medical instruments. The audiovisual controller 5107 and/or operation room control apparatus 5109 control operations of these medical instruments and non-medical instruments in cooperation with each other.

The audiovisual controller 5107 performs overall control of processes related to image display at the medical instruments and non-medical instruments. Specifically, among the apparatuses provided to the operating room system 5100, the apparatus group 5101, ceiling camera 5187, and surgical camera 5189 can be apparatuses (hereinafter, also called dispatch source apparatuses) having the function of dispatching information (hereinafter, also referred to as display information) to be displayed during surgery. In addition, the display apparatuses 5103A to 5103D can be apparatuses (hereinafter, also called output destination apparatuses) at which the display information is output. In addition, the recorder 5105 can be an apparatus to be both a dispatch source apparatus and an output destination apparatus. The audiovisual controller 5107 has the function of controlling operations of the dispatch source apparatuses and the output destination apparatuses and acquiring display information from the dispatch source apparatuses, and additionally of transmitting the display information to an output destination apparatus, and making the display information displayed or recorded. Note that the display information is various types of images captured during surgery, various types of surgery-related information (e.g., physical information of patients, past examination results, information regarding methods of surgical operation, etc.), and the like.

Specifically, information regarding images of the site of surgical operation in a body cavity of a patient captured by endoscopes can be transmitted from the apparatus group 5101 to the audiovisual controller 5107 as display information. In addition, information regarding images of the area around the hands of a surgical operator captured by the ceiling camera 5187 can be transmitted from the ceiling camera 5187 as display information. In addition, information regarding images representing how the entire operating room appears captured by the surgical camera 5189 can be transmitted from the surgical camera 5189 as display information. Note that if there is another apparatus having the image-capturing function in the operating room system 5100, the audiovisual controller 5107 may acquire information regarding images captured by the another apparatus from the another apparatus as display information.

Alternatively, for example, information regarding the images captured in the past is recorded in the recorder 5105 by the audiovisual controller 5107. The audiovisual controller 5107 can acquire information regarding the images captured in the past from the recorder 5105 as display information. Note that various types of surgery-related information may be recorded in the recorder 5105 in advance.

The audiovisual controller 5107 causes at least any one of the display apparatuses 5103A to 5103D which are an output destination apparatuses to display acquired display information (i.e., images captured during surgery, or various types of surgery-related information). In the illustrated example, the display apparatus 5103A is a display apparatus that is installed being suspended from the ceiling of the operating room, the display apparatus 5103B is a display apparatus installed on the wall surface of the operating room, the display apparatus 5103C is a display apparatus installed on a desk in the operating room, and the display apparatus 5103D is a mobile instrument (e.g., tablet PC (Personal Computer)) having a display function.

In addition, although illustration therefor is omitted in FIG. 22, the operating room system 5100 may include an apparatus located outside the operating room. The apparatus located outside the operating room may be a server that is connected to a network constructed inside and outside a hospital, a PC used by a medical staff, a projector installed in a conference room of the hospital, and the like, for example. If such an external apparatus is located outside the hospital, the audiovisual controller 5107 can cause a display apparatus of another hospital to display information via a video conference system or the like, for remote medical practice.

The operation room control apparatus 5109 performs overall control of processes other than processes related to image display at the non-medical instruments. For example, the operation room control apparatus 5109 controls driving of the patient bed 5183, ceiling camera 5187, surgical camera 5189, and lighting system 5191.

The operating room system 5100 is provided with a central manipulation panel 5111, and a user can give an instruction about image display to the audiovisual controller 5107, and can give an instruction about operations of the non-medical instruments to the operation room control apparatus 5109 via the central manipulation panel 5111. The central manipulation panel 5111 is configured being provided with a touch panel on a display surface of a display apparatus.

Figure 23:
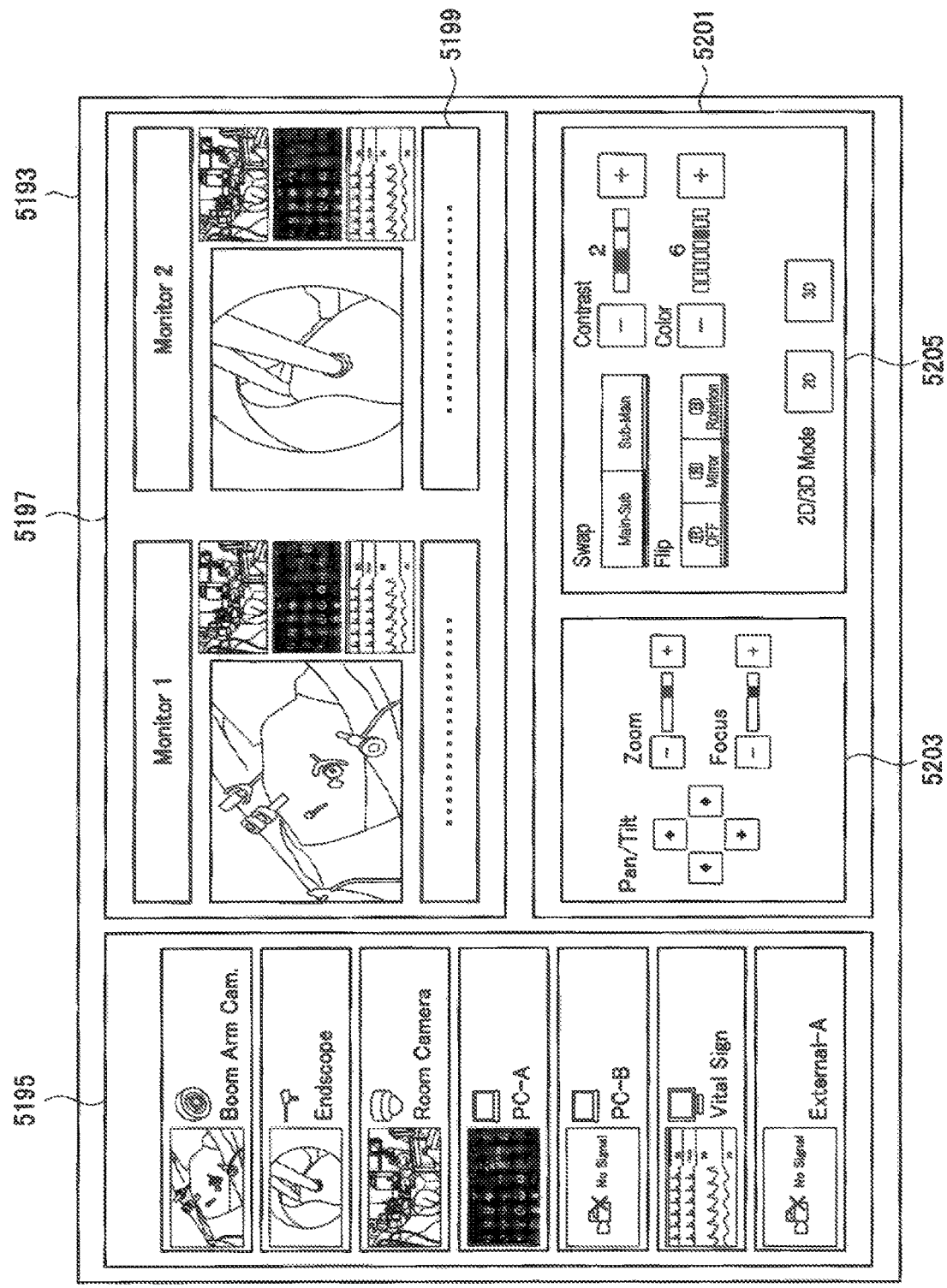
FIG. 23 is a figure illustrating an exemplary display of a manipulation screen on a central manipulation panel.

FIG. 23 is a figure illustrating an exemplary display of a manipulation screen on the central manipulation panel 5111. For example, FIG. 23 illustrates a manipulation screen corresponding to the case where two display apparatuses are provided as output destination apparatuses in the operating room system 5100. As can be seen by referring to FIG. 23, the manipulation screen 5193 is provided with a dispatch source selection area 5195, a preview area 5197, and a control area 5201.

In the dispatch source selection area 5195, a dispatch source apparatus provided in the operating room system 5100, and a thumbnail screen representing display information that the dispatch source apparatus has are displayed in association with each other. A user can select display information that he/she wishes to be displayed on the display apparatus from any one of the dispatch source apparatuses being displayed on the dispatch source selection area 5195.

In the preview area 5197, preview screens of screens to be displayed on the two display apparatuses (Monitor1 and Monitor2), which are output destination apparatuses, are displayed. In the illustrated example, four images are PinP-displayed in one display apparatus. The four images correspond to display information dispatched from a dispatch source apparatus selected in the dispatch source selection area 5195. Among the four images, one image is displayed relatively large as a main image, and the remaining three images are displayed relatively small as sub images. A user can switch the main image and the sub images by selecting areas in which the four images are displayed as appropriate. In addition, a status display area 5199 is provided at a lower portion of the area where the four images are displayed, and the status related to surgery (e.g., the elapsed time of surgery, physical information of a patient, etc.) can be displayed in the area as appropriate.

The control area 5201 is provided with a dispatch source manipulation area 5203 in which GUI (Graphical User Interface) parts for performing manipulation on a dispatch source apparatus are displayed, and an output destination manipulation area 5205 in which GUI parts for performing manipulation on an output destination apparatus are displayed. In the illustrated example, the dispatch source manipulation area 5203 is provided with GUI parts for performing various types of manipulation (pan, tilt, and zoom) on a camera at a dispatch source apparatus having the image-capturing function. A user can select these GUI parts as appropriate to manipulate operations of the camera at the dispatch source apparatus. Note that, although illustration therefor is omitted, if a dispatch source apparatus selected in the dispatch source selection area 5195 is a recorder (i.e., if images recorded in the recorder in the past are displayed in the preview area 5197), the dispatch source manipulation area 5203 can be provided with GUI parts for performing manipulation of playback, playback stop, rewind, forward, and the like of the images.

In addition, the output destination manipulation area 5205 is provided with GUI parts for performing various types of manipulation (swap, flip, color adjustment, contrast adjustment, and switching between 2D display and 3D display) on displays at a display apparatus which is an output destination apparatus. A user can select these GUI parts as appropriate to manipulate displays on the display apparatus.

Note that the manipulation screen displayed in the central manipulation panel 5111 is not limited to the illustrated example, but a user may be able to perform manipulation input for each apparatus that can be controlled by the audiovisual controller 5107 and operation room control apparatus 5109 provided in the operating room system 5100 via the central manipulation panel 5111.

Figure 24:
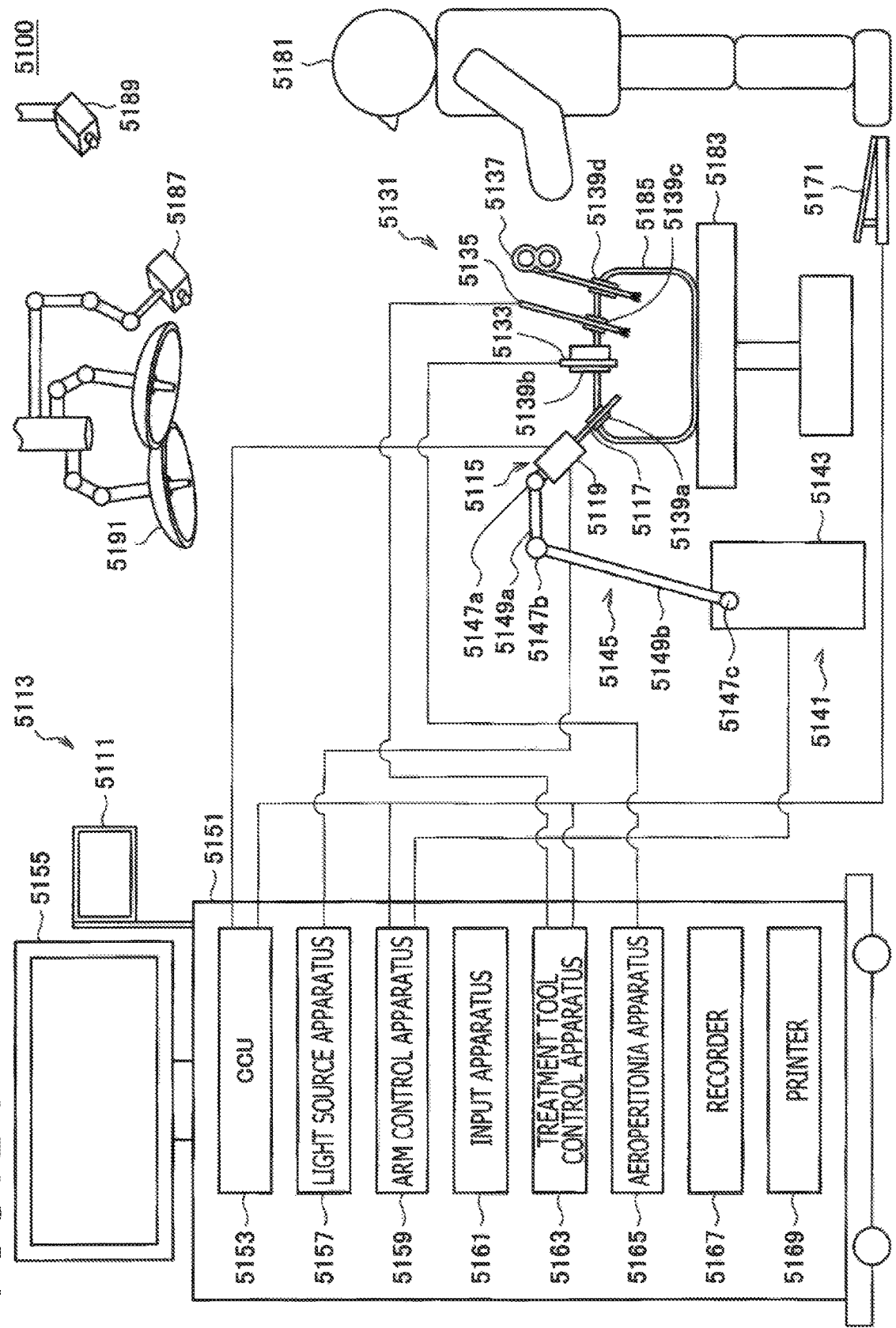
FIG. 24 is a figure illustrating an example of how a surgery to which the operating room system is applied appears.

FIG. 24 is a figure illustrating an example of how a surgery to which the operating room system explained above is applied appears. The ceiling camera 5187 and surgical camera 5189 are provided on the ceiling of the operating room and can capture images representing how the area around the hands of a surgical operator (doctor) 5181 who performs treatment on an affected area on the patient 5185 on the patient bed 5183, and the entire space of the operating room appear. The ceiling camera 5187 and surgical camera 5189 can be provided with the magnification adjustment function, the focal length adjustment function, the image-capturing direction adjustment function, and the like. The lighting system 5191 is provided on the ceiling of the operating room, and irradiate at least the area around the hands of the surgical operator 5181. The lighting system 5191 may be able to be subjected to adjustment as appropriate in terms of the irradiation light amount, the wavelength (color) of the irradiation light, the light irradiation direction, and the like.

The endoscopic surgery system 5113, patient bed 5183, ceiling camera 5187, surgical camera 5189, and lighting system 5191 are connected to each other via the audiovisual controller 5107 and operation room control apparatus 5109 as illustrated in FIG. 22 (not illustrated in FIG. 24) such that they can cooperate with each other. The central manipulation panel 5111 is provided in the operating room, and, as mentioned above, a user can manipulate these apparatuses present in the operating room via the central manipulation panel 5111 as appropriate.

Hereinafter, the configuration of the endoscopic surgery system 5113 is explained in detail. As illustrated in the figure, the endoscopic surgery system 5113 is constituted by the endoscope 5115, other surgical tools 5131, a support arm apparatus 5141 that supports the endoscope 5115, and a cart 5151 in which various types of apparatuses for endoscopic surgery are mounted.

In endoscope surgery, instead of laparotomy of incising an abdominal wall, a plurality of cylindrical opening tools called trocars 5139*a* to 5139*d* are placed through an abdominal wall. Then, a lens barrel 5117 of the endoscope 5115, and the other surgical tools 5131 are inserted into the body cavity of the patient 5185 through the trocars 5139*a* to 5139*d*. In the illustrated example, a pneumoperitoneum tube 5133, an energy treatment tool 5135, and forceps 5137 are inserted into the body cavity of the patient 5185 as those surgical tools 5131. In addition, the energy treatment tool 5135 is a treatment tool for performing tissue incision and peeling, blood vessel sealing or the like by means of high-frequency current or ultrasonic vibration. It should be noted that, however, the illustrated surgical tools 5131 are merely examples, and as the surgical tools 5131, various types of surgical tools that are typically used in endoscopic surgery, such as tweezers or retractors, may be used, for example.

Images of the site of surgical operation in the body cavity of the patient 5185 captured by the endoscope 5115 are displayed on the display apparatus 5155. The surgical operator 5181 performs a treatment such as excision of an affected area, for example, by using the energy treatment tool 5135 and the forceps 5137 while looking at the images of the site of surgical operation displayed on the display apparatus 5155 in real time. Note that, although illustration therefor is omitted, the pneumoperitoneum tube 5133, energy treatment tool 5135, and forceps 5137 are supported by the surgical operator 5181, an assistant, or the like during surgery.

(Support Arm Apparatus)

The support arm apparatus 5141 includes an arm portion 5145 that extends from a base part 5143. In the illustrated example, the arm portion 5145 is constituted by joint portions 5147*a*, 5147*b*, and 5147*c*, and links 5149*a* and 5149*b*, and is driven by control of an arm control apparatus 5159. The endoscope 5115 is supported by the arm portion 5145, and the position and posture of the endoscope 5115 is controlled by the arm portion 5145. Thereby, stable positional fixation of the endoscope 5115 can be realized.

(Endoscope)

The endoscope 5115 is constituted by the lens barrel 5117 whose partial area with a predetermined length from the tip is inserted into the body cavity of the patient 5185, and a camera head 5119 connected to the base end of the lens barrel 5117. Although in the illustrated example, the endoscope 5115 configured as a so-called hard mirror having a hard lens barrel 5117 is illustrated, the endoscope 5115 may be configured as a so-called soft mirror having a soft lens barrel 5117.

The tip of the lens barrel 5117 is provided with an open portion into which an objective lens is fit. The endoscope 5115 is connected with a light source apparatus 5157, and light generated by the light source apparatus 5157 is guided to the tip of the lens barrel by a light guide that extends inside the lens barrel 5117, and irradiated toward an observation target in the body cavity of the patient 5185 via the objective lens. Note that the endoscope 5115 may be a direct-view mirror, or may be an oblique-view mirror or side-view mirror.

The inner space of the camera head 5119 is provided with an optical system and an image-capturing element, and reflected light from the observation target (observation light) is concentrated onto the image-capturing element by the optical system. The image-capturing element performs photoelectric conversion of the observation light, and electronic signals corresponding to the observation light, that is, image signals corresponding to the observation image are generated. The image signals are transmitted to a camera control unit (CCU) 5153 as RAW data. Note that the camera head 5119 has the function of adjusting the magnification and focal length by driving its optical system as appropriate.

Note that, for example, the camera head 5119 may be provided with a plurality of image-capturing elements in order to support stereoscopic view (3D display) or the like. In this case, the space inside the lens barrel 5117 is provided with a plurality of relay optical systems for guiding observation light to each of the plurality of image-capturing elements.

(Various Types of Apparatuses Mounted in Cart) The CCU 5153 is constituted by a CPU (Central Processing Unit), a GPU (Graphics Processing Unit), and the like, and performs overall control of operations of the endoscope 5115 and display apparatus 5155. Specifically, the CCU 5153 performs various types of image processing on image signals received from the camera head 5119 for displaying images that are based on the image signals such as development processing (demosaicing), for example. The CCU 5153 provides the image signals having been subjected to the image processing to the display apparatus 5155. In addition, the CCU 5153 is connected with the audiovisual controller 5107 illustrated in FIG. 22. The CCU 5153 provides the image signals having been subjected to the image processing also to the audiovisual controller 5107. In addition, the CCU 5153 transmits control signals to the camera head 5119 and controls its driving. The control signals can include information regarding image-capturing conditions such as the magnification or focal length. Information regarding the image-capturing conditions may be input via the input apparatus 5161, or may be input via the central manipulation panel 5111 mentioned above.

Under the control of the CCU 5153, the display apparatus 5155 displays images that are based on the image signals having been subjected to the image processing by the CCU 5153. If the endoscope 5115 supports high resolution image-capturing for 4K (horizontal pixel count 3840×vertical pixel count 2160), 8K (horizontal pixel count 7680×vertical pixel count 4320) or the like, for example, and/or supports 3D displays, the display apparatus 5155 that may be used is a display apparatus that is capable of high resolution display, and/or is capable of 3D display, corresponding to either of or both the cases. If the display apparatus supports high resolution image-capturing for 4K, 8K or the like, a higher degree of sense of immersion can be attained by using a display apparatus having a size of 55 inches or larger as the display apparatus 5155. In addition, a plurality of display apparatuses 5155 with different resolutions or sizes may be provided according to uses.

The light source apparatus 5157 is constituted by a light source such as an LED (light emitting diode), for example, and supplies the endoscope 5115 with irradiation light to be used when an image of a site of surgical operation is captured.

The arm control apparatus 5159 is constituted by a processor such as a CPU, for example, and operates according to a predetermined program to thereby control driving of the arm portion 5145 of the support arm apparatus 5141 according to a predetermined manner of control.

The input apparatus 5161 is an input interface for the endoscopic surgery system 5113. A user can input various types of information and input instructions to the endoscopic surgery system 5113 via the input apparatus 5161. For example, a user inputs various types of surgery-related information such as physical information of a patient or information regarding a method of surgical operation of a surgery via the input apparatus 5161. In addition, for example, a user inputs via the input apparatus 5161: an instruction to drive the arm portion 5145; an instruction to alter conditions of image-capturing by the endoscope 5115 (the type of irradiation light, magnification, focal length, etc.); an instruction to drive the energy treatment tool 5135; and the like.

The type of the input apparatus 5161 is not limited, but the input apparatus 5161 may be various types of known input apparatuses. The input apparatus 5161 that can be applied includes a mouse, a keyboard, a touch panel, a switch, a foot switch 5171, and/or a lever, for example. If a touch panel is used as the input apparatus 5161, the touch panel may be provided on the display surface of the display apparatus 5155.

Alternatively, the input apparatus 5161 is a device that is worn by a user such as a glass-type wearable device or an HMD (Head Mounted Display), for example, and various types of input are performed according to gestures or gazes of the user detected by these devices. In addition, the input apparatus 5161 includes a camera that can detect motions of a user, and various types of input are performed according to gestures or gazes of the user detected in a video captured by the camera. Furthermore, the input apparatus 5161 includes a microphone that can acquire sounds of the voice of a user, and various types of input are performed based on sounds via the microphone. In this manner, by the input apparatus 5161 being configured to be able to receive various types of information in a contactless manner, it becomes possible in particular for a user belonging to a clean area (e.g., the surgical operator 5181) to manipulate instruments belonging to an unclear area in a contactless manner. In addition, since it becomes possible for the user to manipulate instruments without unholding surgical tools he/she has, the convenience for the user improves.

A treatment tool control apparatus 5163 controls driving of the energy treatment tool 5135 for tissue cauterization, incision, blood vessel sealing, and the like. An aeroperitonia apparatus 5165 feeds gas into the body cavity of the patient 5185 via the pneumoperitoneum tube 5133 in order to inflate the body cavity for the purpose of ensuring that there is a field of view for the endoscope 5115 and of ensuring there is a work space for a surgical operator. A recorder 5167 is an apparatus capable of recording various types of surgery-related information. A printer 5169 is an apparatus capable of printing various types of surgery-related information in various types of formats such as text, images or graphs.

Hereinafter, particularly characteristic configurations of the endoscopic surgery system 5113 are explained in further detail.

(Support Arm Apparatus)

The support arm apparatus 5141 includes a base part 5143 which is the base, and an arm portion 5145 that extends from the base part 5143. Although in the illustrated example, the arm portion 5145 is constituted by the plurality of joint portions 5147*a*, 5147*b*, and 5147*c*, and the plurality of links 5149*a* and 5149*b* that are interconnected by the joint portion 5147*b*, the configuration of the arm portion 5145 is illustrated in a simplified form for simplification in FIG. 24. Actually, the shapes, numbers and arrangement of the joint portions 5147*a* to 5147*c* and links 5149*a* and 5149*b*, the directions of the axes of rotation of the joint portions 5147*a* to 5147*c*, and the like can be set as appropriate in order to attain desired degrees of freedom of the arm portion 5145. For example, the arm portion 5145 can be suitably configured to have six degrees of freedom or more. Since it becomes possible thereby to move the endoscope 5115 freely within the movable range of the arm portion 5145, it becomes possible to insert the lens barrel 5117 of the endoscope 5115 into the body cavity of the patient 5185 from a desired direction.

The joint portions 5147*a* to 5147*c* are provided with actuators, and the joint portions 5147*a* to 5147*c* are configured to be rotatable about predetermined axes of rotation by driving of the actuators. By the driving of the actuators being controlled by the arm control apparatus 5159, the rotation angle of each of the joint portions 5147*a* to 5147*c* is controlled, and driving of the arm portion 5145 is controlled. Thereby, positional and postural control of the endoscope 5115 can be realized. At this time, the arm control apparatus 5159 can control driving of the arm portion 5145 by various types of known manners of control such as force control or positional control.

For example, by the surgical operator 5181 performing manipulation input as appropriate via the input apparatus 5161 (including the foot switch 5171), driving of the arm portion 5145 may be controlled as appropriate by the arm control apparatus 5159 according to the manipulation input, and the position and posture of the endoscope 5115 may be controlled. After the endoscope 5115 at the tip of the arm portion 5145 is moved from a given position to another given position by the control, the endoscope 5115 can be supported fixedly at the position after the movement. Note that the arm portion 5145 may be manipulated in a so-called master-slave manner. In this case, the arm portion 5145 can be remotely manipulated by a user via the input apparatus 5161 installed at a place distant from the operating room.

In addition, if force control is applied, the arm control apparatus 5159 may perform so-called power-assisted control of receiving an external force from a user and driving the actuator of each of the joint portions 5147*a* to 5147*c* so as to move the arm portion 5145 smoothly according to the external force. Thereby, when the user moves the arm portion 5145 while directly touching the arm portion 5145, he/she can move the arm portion 5145 with a relatively weak force. Accordingly, it becomes possible to move the endoscope 5115 more intuitively and with simpler manipulation, thereby improving the convenience for users.

Here, typically, the endoscope 5115 is supported by a doctor called a scopist in endoscopic surgery. In contrast to this, it becomes possible to more surely fix the position of the endoscope 5115 without manpower by using the support arm apparatus 5141, and so it becomes possible to obtain images of a site of surgical operation stably and perform surgeries smoothly.

Note that the arm control apparatus 5159 is not necessarily provided to the cart 5151. In addition, the arm control apparatus 5159 is not necessarily one apparatus. For example, the arm control apparatus 5159 may be provided to each of the individual joint portions 5147*a* to 5147*c* of the arm portion 5145 of the support arm apparatus 5141, and driving control of the arm portion 5145 may be realized by a plurality of the arm control apparatuses 5159 cooperating with each other.

(Light Source Apparatus)

The light source apparatus 5157 supplies the endoscope 5115 with irradiation light to be used when images of a site of surgical operation are captured. The light source apparatus 5157 is constituted by a white light source constituted by an LED, a laser light source, or a combination of them, for example. At this time, since if the white light source is constituted by a combination of RGB laser light sources, the output intensity and output timing of each color (each wavelength) can be controlled highly precisely, the white balance of a captured image can be adjusted at the light source apparatus 5157. In addition, in this case, it is also possible to capture an image corresponding to each of RGB in a time-divided manner by irradiating an observation target with laser light from each of the RGB laser light sources in a time-divided manner and controlling driving of an image-capturing element of the camera head 5119 in synchronization with the irradiation timing. According to the method, color images can be obtained even if color filters are not provided to the image-capturing element.

In addition, driving of the light source apparatus 5157 may be controlled such that the intensity of output light is altered every time a predetermined length of time elapses. It is possible to generate high-dynamic range images without so-called crushed shadows or clipped whites by controlling driving of the image-capturing element of the camera head 5119 in synchronization with the timing of alteration of the intensity of light, acquiring images in a time-divided manner, and synthesizing the images.

In addition, the light source apparatus 5157 may be configured to be able to supply light in a predetermined wavelength band corresponding to special light observation. In special light observation, for example, so-called narrow band imaging in which the wavelength dependence of absorption of light in body tissues is utilized to capture images of a predetermined tissue such as a blood vessel in a mucous membrane surface layer at a high contrast by irradiation with light in a narrow band as compared with irradiation light used at a time of normal observation (i.e., white light). Alternatively, in special light observation, fluorescence observation to obtain images by using fluorescence generated through irradiation with excitation light may be performed. In fluorescence observation: a body tissue is irradiated with excitation light, and fluorescence from the body tissue is observed (self-fluorescence observation); fluorescence images are obtained by locally injecting a reagent such as indocyanine green (ICG) into a body tissue, and irradiating the body tissue with excitation light corresponding to the wavelength of fluorescence of the reagent; and so on. The light source apparatus 5157 can be configured to be able to supply narrow band light and/or excitation light corresponding to such special light observation.

(Camera Head and CCU)

Figure 25:
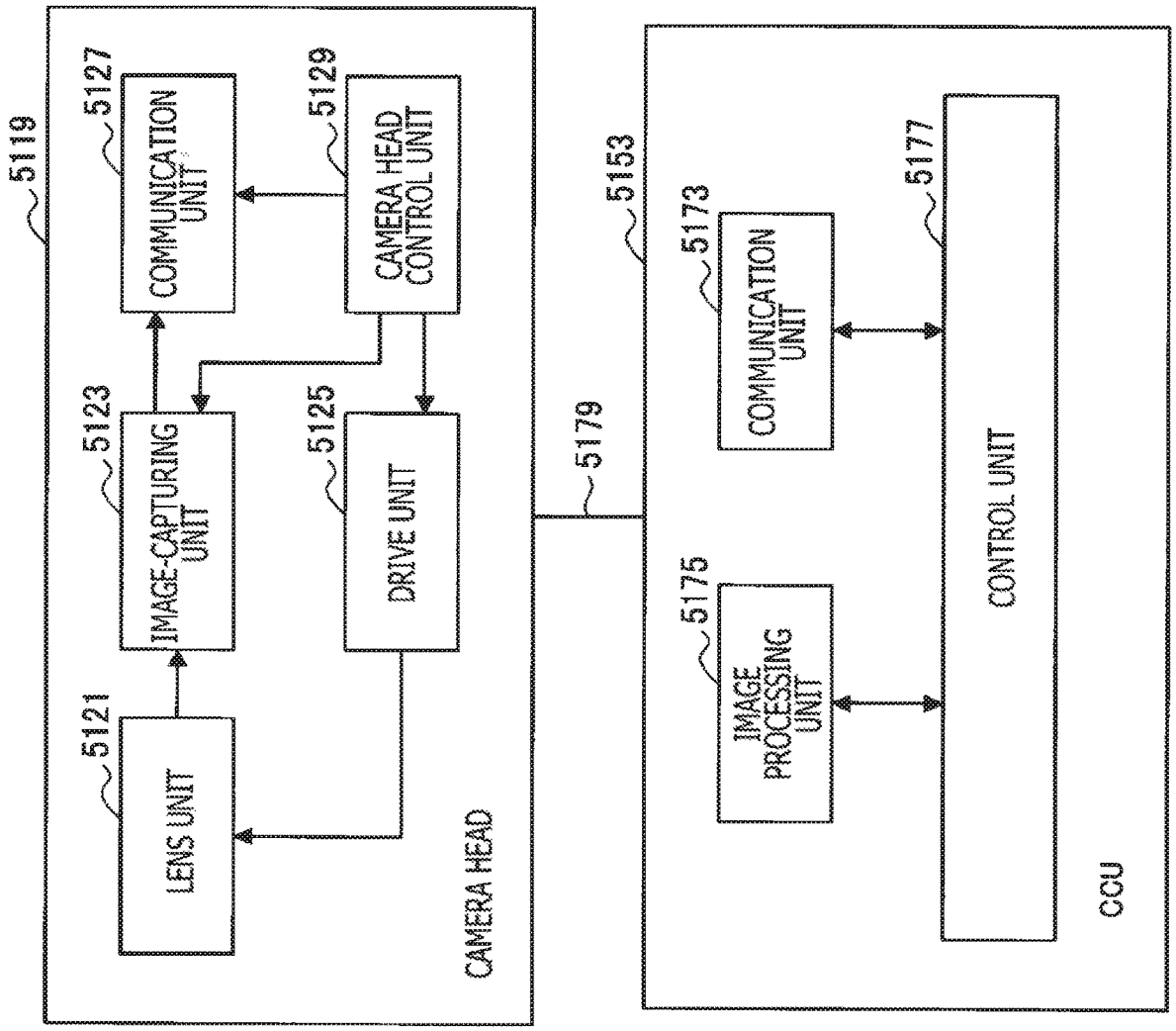
FIG. 25 is a block diagram illustrating exemplary functional configurations of a camera head and a CCU illustrated in FIG. 24.

With reference to FIG. 25, functions of the camera head 5119 and CCU 5153 of the endoscope 5115 are explained in more detail. FIG. 25 is a block diagram illustrating exemplary functional configurations of the camera head 5119 and the CCU 5153 illustrated in FIG. 24.

As can be seen by referring to FIG. 25, the camera head 5119 has, as its function, a lens unit 5121, an image-capturing unit 5123, a drive unit 5125, a communication unit 5127, and a camera head control unit 5129. In addition, the CCU 5153 has, as its function, a communication unit 5173, an image processing unit 5175, and a control unit 5177. The camera head 5119 and the CCU 5153 are connected to each other by a transmission cable 5179 bidirectionally communicatively.

First, the functional configuration of the camera head 5119 is explained. The lens unit 5121 is an optical system provided at a portion of connection with the lens barrel 5117. Observation light taken in from the tip of the lens barrel 5117 is guided to the camera head 5119, and enters the lens unit 5121. The lens unit 5121 is constituted by a combination of a plurality of lenses including a zoom lens and a focus lens. The lens unit 5121 has optical properties that are adjusted to concentrate observation light onto the reception surface of an image-capturing element of the image-capturing unit 5123. In addition, the zoom lens and focus lens are configured to have positions on the light axis that can be moved for adjustment of the magnification and focus of a captured image.

The image-capturing unit 5123 is constituted by an image-capturing element and is arranged downstream of the lens unit 5121. Observation light having passed through the lens unit 5121 is concentrated onto reception surface of the image-capturing element, and image signals corresponding to an observation image are generated by photoelectric conversion. The image signals generated by the image-capturing unit 5123 are provided to the communication unit 5127.

The image-capturing element that is used to configure the image-capturing unit 5123 is, for example, a CMOS (Complementary Metal Oxide Semiconductor) image sensor, and one having a Bayer array and capable of capturing color images. Note that the image-capturing element used may support capturing of images at a high resolution of 4K or higher, for example. If images of a site of surgical operation are obtained at a high resolution, the surgical operator 5181 can know how the site of surgical operation appears in more detail, and it becomes possible to proceed with the surgery more smoothly.

In addition, the image-capturing element constituting the image-capturing unit 5123 is configured to have one pair of image-capturing elements for acquiring right-eye image signals and left-eye image signals corresponding to 3D displays. By performing 3D displays, it becomes possible for the surgical operator 5181 to know more accurately the depth of living body tissues at a site of surgical operation. Note that if the image-capturing unit 5123 is constituted by multiple plates, lens units 5121 are also provided in a plurality of systems corresponding to individual image-capturing elements.

In addition, the image-capturing unit 5123 is not necessarily provided to the camera head 5119. For example, the image-capturing unit 5123 may be provided immediately after an objective lens inside the lens barrel 5117.

The drive unit 5125 is constituted by an actuator, and under control of the camera head control unit 5129, the drive unit 5125 moves the zoom lens and focus lens of the lens unit 5121 along the light axis by a predetermined distance. Thereby, the magnification and focus of images captured by the image-capturing unit 5123 can be adjusted as appropriate.

The communication unit 5127 is constituted by a communication apparatus for transmitting and receiving various types of information to and from the CCU 5153. The communication unit 5127 transmits, as RAW data, image signals obtained from the image-capturing unit 5123 to the CCU 5153 via the transmission cable 5179. At this time, in order to display captured images of a site of surgical operation with low latency, the image signals are preferably transmitted by optical communication. This is because, since the surgical operator 5181 performs a surgery while observing the state of an affected area on captured images at the time of the surgery, it is required that motion images of the site of surgical operation be displayed real time at the highest degree possible for performing a safer and surer surgery. If optical communication is performed, the communication unit 5127 is provided with a photoelectric conversion module that converts electronic signals into optical signals. After being converted into optical signals by the photoelectric conversion module, image signals are transmitted to the CCU 5153 via the transmission cable 5179.

In addition, the communication unit 5127 receives from the CCU 5153 a control signal for controlling driving of the camera head 5119. For example, the control signal includes information regarding image-capturing conditions such as information indicating that the frame rate of captured images is designated, information indicating that the exposure value at the time of image-capturing is designated, and/or information indicating that the magnification and focus of captured images are designated. The communication unit 5127 provides the received control signal to the camera head control unit 5129. Note that the control signal from the CCU 5153 may also be transmitted by optical communication. In this case, the communication unit 5127 is provided with a photoelectric conversion module that converts an optical signal into an electronic signal, and after being converted into an electronic signal by the photoelectric conversion module, the control signal is provided to the camera head control unit 5129.

Note that the image-capturing conditions explained above such as the frame rate or exposure value, magnification, or focus are automatically set by the control unit 5177 of the CCU 5153 based on the acquired image signal. That is, a so-called AE (Auto Exposure) function, AF (Auto Focus) function, and AWB (Auto White Balance) function are implemented in the endoscope 5115.

The camera head control unit 5129 controls driving of the camera head 5119 based on the control signal from the CCU 5153 received via the communication unit 5127. For example, the camera head control unit 5129 controls driving of the image-capturing element of the image-capturing unit 5123 based on information indicating that the frame rate of captured images is designated, and/or information indicating that exposure at the time of image-capturing is designated. In addition, for example, the camera head control unit 5129 moves the zoom lens and focus lens of the lens unit 5121 as appropriate via the drive unit 5125 based on the information indicating that the magnification and focus of captured images are designated. The camera head control unit 5129 may further have a function of storing information for identifying the lens barrel 5117 and camera head 5119.

Note that by arranging configurations such as the lens unit 5121 and image-capturing unit 5123 in a highly airtight and waterproof sealed structure, the camera head 5119 can be made resistant to autoclave sterilization processes.

Next, the functional configuration of the CCU 5153 is explained. The communication unit 5173 is constituted by a communication apparatus for transmitting and receiving various types of information to and from the camera head 5119. The communication unit 5173 receives an image signal transmitted from the camera head 5119 via the transmission cable 5179. At this time, as explained above, the image signal can be suitably transmitted by optical communication. In this case, corresponding to optical communication, the communication unit 5173 is provided with a photoelectric conversion module that converts an optical signal into an electronic signal. The communication unit 5173 provides an image signal converted into an electronic signal to the image processing unit 5175.

In addition, the communication unit 5173 transmits a control signal for controlling driving of the camera head 5119 to the camera head 5119. The control signal may also be transmitted by optical communication.

The image processing unit 5175 performs various types of image processing on image signals which are RAW data transmitted from the camera head 5119. For example, the image processing include various types of known signal processing such as development processing, processing for enhancing image equality (band enhancement, super-resolution processing, NR (Noise reduction) processing, and/or shake-correction processing, etc.), and/or enlargement processing (electronic zoom processing). In addition, the image processing unit 5175 performs detection processing on image signals for performing AE, AF, and AWB.

The image processing unit 5175 is constituted by processors such as a CPU and a GPU, and by the processors operating according to predetermined programs, the image processing or detection processing mentioned above can be performed. Note that if the image processing unit 5175 is constituted by a plurality of GPUs, the image processing unit 5175 divides information related to image signals as appropriate, and performs image processing in parallel using the plurality of GPUs.

The control unit 5177 performs various types of control related to image-capturing of a site of surgical operation by the endoscope 5115, and display of the captured images. For example, the control unit 5177 generates a control signal for controlling driving of the camera head 5119. At this time, if image-capturing conditions have been input by a user, the control unit 5177 generates a control signal based on the input by the user. Alternatively, if the AE function, AF function, and AWB function are implemented in the endoscope 5115, the control unit 5177 calculates an optimal exposure value, focal length and white balance as appropriate according to a result of detection processing by the image processing unit 5175, and generates a control signal.

In addition, the control unit 5177 causes the display apparatus 5155 to display images of a site of surgical operation on the basis of image signals having been subjected to image processing by the image processing unit 5175. At this time, the control unit 5177 recognizes various types of objects in images of the site of surgical operation by using various types of image recognition technologies. For example, by detecting the edge shape, color or the like of an object included in an image of a site of surgical operation, the control unit 5177 can recognize a surgical tool such as forceps, a particular living body site, bleeding, mist at the time of use of the energy treatment tool 5135, and the like. When an image of a site of surgical operation is displayed on the display apparatus 5155, the control unit 5177 superimposes various types of surgical assist information on the image of the site of surgical operation by using a result of the recognition. With the surgical assist information being superimposed and presented to the surgical operator 5181, it becomes possible to proceed with the surgery more safely and surely.

The transmission cable 5179 connecting the camera head 5119 and CCU 5153 is an electronic signal cable supporting electronic signal communication, an optical fiber supporting optical communication, or a composite cable formed by them.

Here, although in the illustrated example, wired communication is performed using the transmission cable 5179, communication between the camera head 5119 and the CCU 5153 may be performed wirelessly. If the communication between them is performed wirelessly, it becomes unnecessary to place the transmission cable 5179 in the operating room, and so it is possible to resolve a situation where movement of the medical staff in the operating room is hindered by the transmission cable 5179.

One example of the operating room system 5100 to which the technology according to the present disclosure can be applied is explained above. Note that although in the example explained here, the medical system to which the operating room system 5100 is applied is the endoscopic surgery system 5113, the configuration of the operating room system 5100 is not limited to the example. For example, instead of the endoscopic surgery system 5113, the operating room system 5100 may be applied to an examination soft endoscope system or a microsurgery system.

For example, the technology according to the present disclosure can be applied to the audiovisual controller 5107 or central manipulation panel 5111 among the configurations explained above.

As mentioned above, the audiovisual controller 5107 controls operations of display information dispatch apparatuses such as the apparatus group 5101, ceiling camera 5187 and surgical camera 5189, display information output apparatuses such as the display apparatuses 5103A to 5103D, and, moreover, recording/playback apparatuses such as the recorder 5105 that are provided to the operating room system 5100, and additionally monitors the communication status of these individual apparatuses.

Information obtained through monitoring by the audiovisual controller 5107 is displayed on the central manipulation panel 5111. On the central manipulation panel 5111, information indicating the group-by-group communication status explained with reference to FIG. 9 to FIG. 20 above is displayed, for example.

By monitoring this display information, for example, even if an emergency such as interruption of images of a particular group occurs, it becomes possible to immediately determine the location where a communication error is occurring or the like based on the display information on the central manipulation panel 5111. In addition, it becomes possible to promptly handle the situation also by performing group-by-group communication switching.

8. Summary of Configuration of Present Disclosure

Embodiments of the present disclosure are explained in detail above, with reference to particular embodiments. However, it is apparent that those skilled in the art can modify the embodiments or conceive of substitutions in the embodiments within the scope without deviating from the main points of the present disclosure. That is, the present invention is disclosed in the form of illustration, and such disclosure should not be construed as limitations. In order to understand the main points of the present disclosure, the section of Claims should be considered.

Note that the technology disclosed in the present specification can have configurations like the ones illustrated below.

(1) An information processing apparatus including:
a data processing unit that generates display information that allows identification of data of inter-group communication between a transmission data group including a plurality of pieces of transmission data and a reception data group including a plurality of pieces of reception data.

(2) The information processing apparatus according to (1), in which the data processing unit generates display information indicating an inter-group connection relation of the transmission data group and the reception data group.

(3) The information processing apparatus according to (1), in which the data processing unit generates display information having a connection line that allows identification of a communication state of individual pieces of communication data including a plurality of pieces of transmission data included in the transmission data group and a plurality of pieces of reception data included in the reception data group.

(4) The information processing apparatus according to (3), in which the connection line includes a connection line that allows identification about the individual pieces of communication data whether communication is being executed or communication is stopped.

(5) The information processing apparatus according to any one of (1) to (4), in which the data processing unit generates display information including a communication data identifier indicating a communication data content about the individual pieces of communication data.

(6) The information processing apparatus according to any one of (1) to (5), in which the data processing unit generates display information that allows identification of an error about the individual pieces of communication data.

(7) The information processing apparatus according to any one of (1) to (6), in which the data processing unit generates display information including warning information that allows identification of an error content about the individual pieces of communication data.

(8) The information processing apparatus according to (7), in which the data processing unit generates display information in which a display position of the warning information is set near a group icon indicating a data group to which transmission and reception data of an error-detected instrument belongs.

(9) The information processing apparatus according to (7), in which, if an error has occurred on a data transmission side, the data processing unit generates display information in which a display position of the warning information is set near a group icon side of a transmission data group side, and if an error has occurred on a data reception side, the data processing unit generates display information in which a display position of the warning information is set near a group icon side of a reception data group side.

(10) The information processing apparatus according to any one of (1) to (9), in which the data processing unit generates display information of a group selection portion used for selecting a group of communication data as a display target.

(11) The information processing apparatus according to any one of (10), in which
the group selection portion includes a device list which includes an instrument list of network-connected instruments to perform a transmission or reception process for communication data constituting the transmission data group or the reception data group, and the data processing unit selects, as a display target, a transmission data group or a reception data group to which transmission data or reception data of a selection device belongs according to device selection information for the device list.

(12) The information processing apparatus according to (10) or (11), in which
the group selection portion includes a group list including an identifier of the transmission data group or the reception data group, and
the data processing unit selects a selection group as a display target according to group selection information for the group list.

(13) The information processing apparatus according to any one of (1) to (12), in which the data processing unit generates display information including a detail information display portion that allows switchable display of each piece of detail information of:
(a) device detail information which includes instrument-by-instrument detail information regarding network-connected instruments that perform a transmission or reception process for communication data;
(b) group detail information which includes group-by-group detail information regarding either the transmission data group or the reception data group; and
(c) terminal detail information which includes unit-by-unit detail information regarding transmitting units or receiving units for each piece of communication data of either transmission data or reception data in data communicated between the network-connected instruments.

(14) The information processing apparatus according to (13), in which the device detail information which includes the instrument-by-instrument detail information regarding network-connected instruments includes detail information regarding a device error.

(15) The information processing apparatus according to (13) or (14), in which the group detail information includes detail information regarding communication data included in a group.

(16) The information processing apparatus according to any one of (13) to (15), in which the terminal detail information includes terminal error detail information which includes unit-by-unit error information regarding transmitting units or receiving units for each piece of communication data.

(17) The information processing apparatus according to any one of (1) to (16), in which, if a communication data error has occurred while other display information different from the display information that allows identification of the communication data is being displayed on a display unit, the data processing unit performs a process of causing a transition of display information on the display unit to the display information that allows identification of the communication data.

(18) The information processing apparatus according to any one of (1) to (17), in which
the plurality of pieces of transmission data constituting the transmission data group includes data transmitted by one or a plurality of transmitting apparatuses, and
the plurality of pieces of reception data constituting the reception data group includes data received by one or a plurality of receiving apparatuses.

(19) An information processing method executed at an information processing apparatus, the information processing method including:
generating, by a data processing unit of the information processing apparatus, display information that allows identification of data of inter-group communication between a transmission data group including a plurality of pieces of transmission data and a reception data group including a plurality of pieces of reception data.

(20) A program that causes information processing to be executed at an information processing apparatus, the program including:
causing a data processing unit of the information processing apparatus to generate display information that allows identification of data of inter-group communication between a transmission data group including a plurality of pieces of transmission data and a reception data group including a plurality of pieces of reception data.

In addition, a series of processes explained in the specification can be executed by hardware, software, or a combined configuration of both of them. If a process by software is executed, a program in which a process sequence is recorded can be installed and executed in a memory in a computer into which dedicated hardware is incorporated, or the program can be installed and executed in a general-purpose computer capable of executing various types of processes. For example, the program can be recorded in a recording medium in advance. Other than being installed in a computer from a recording medium, the program can be received via a network such as a LAN (Local Area Network) or the internet, and can be installed in a recording medium such as a built-in hard disk.

Note that the various types of processing described in the specification may not only be executed in a temporal order according to the description, but may be executed in parallel or individually as necessary or depending on the processing capability of an apparatus that executes the processes. In addition, a system in the present specification is a logical set configuration of a plurality of apparatuses, and is not limited to one in which apparatuses with individual configurations are in a single housing.

INDUSTRIAL APPLICABILITY

As has been explained above, according to the configuration of one embodiment of the present disclosure, it becomes possible to provide a user (monitor) with display information that indicates the communication status of network-connected instruments and that makes it possible to easily know an error-detected position, error contents, the extent of influence of an error and the like.

Specifically, display information that allows identification of data of inter-group communication between a transmission data group constituted by a plurality of pieces of transmission data, and a reception data group constituted by a plurality of pieces of reception data is generated. Information is displayed such that it becomes possible to identify whether communication of each piece of data among a plurality of pieces of communication data of each group is underway or stopped. Furthermore, at a time of occurrence of an error, warning information including an error level or contents is displayed on a connection line.

With this configuration, it becomes possible to provide a user (monitor) with display information that indicates the communication status of network-connected instruments and that makes it possible to easily know an error-detected position, error contents, the extent of influence of an error and the like.

REFERENCE SIGNS LIST

10 Information processing system
20 Information processing apparatus (system monitoring apparatus)
21 System controller
30 Network
40 Transmitting/receiving apparatus
71 to 73 Transmission data group
91 to 93 Reception data group
110 Group selection portion
111 Apparatus (device) information display area
112 Group information sub display area
113 Apparatus (device) search portion
114 Apparatus (device) list display portion
115 Group search portion
116 Group list display portion
120 Connection information display portion
121 Transmission data group (SG) display area
122 Reception data group (DG) display area
123 Connection information display area
124 Group icon
125 Communication terminal icon
126 Communication data identifier
127 Warning information
130 Detail information display portion
131 Communication state display area
132 Apparatus (device) attribute information display area
133 Apparatus (device) terminal information display area
134 Apparatus (device) error information display area
141 Group identifier display area
142 Group-belonging communication data display area
151 Terminal name display area
152 Terminal setting apparatus (device) name display area
153 Terminal communication information display area
154 Terminal attribute information display area
155 Terminal error information display area
201 Process selection list
301 CPU
302 ROM
303 RAM
304 Bus
305 Input/output interface
306 Input unit
307 Output unit
308 Storage unit
309 Communication unit
310 Drive
311 Removable medium

The invention claimed is:
1. An information processing apparatus, comprising:
processing circuitry configured to:
receive instrument information from instruments that are communicatively connected to the information processing apparatus via a network, the instrument information specifying a plurality of instances of inter-instrument communication among the instruments, and identifying pieces of transmission data and pieces of reception data for the instances of inter-instrument communication;

arrange, according to the instrument information, the pieces of transmission data into transmission data groups and the pieces of reception data into reception data groups, transmission processing within a respective transmission data group being collectively controlled, and reception processing within a respective reception data group being collectively controlled; and generate a user interface for display on a screen according to the instrument information, the user interface including:

source group icons each representing a respective one of the transmission data groups; and reception group icons each representing a respective one of the reception data groups.

2. The information processing apparatus according to claim 1, wherein the processing circuitry is configured to generate the user interface that includes connection lines each representing a respective one of the instances of inter-instrument communication and visually connecting a source group icon and a reception group icon corresponding to the respective one of the instances of inter-instrument communication.

3. The information processing apparatus according to claim 2, wherein the processing circuitry is configured to generate the user interface that includes the connection lines rendered to indicate respective communication conditions of the instances of inter-instrument communication.

4. The information processing apparatus according to claim 3, wherein the connection lines are rendered according to different line patterns to indicate whether the respective instances of inter-instrument communication are being executed or stopped.

5. The information processing apparatus according to claim 1, wherein the processing circuitry is configured to generate the user interface that includes a communication data identifier indicating a communication data content transmitted on one of the instances of inter-instrument communication.

6. The information processing apparatus according to claim 1, wherein the processing circuitry is configured to generate the user interface that includes an error message indicating an error occurs on one of the instances of inter-instrument communication.

7. The information processing apparatus according to claim 6, wherein the error message is displayed at a display position closer to a group icon than other group icons among the source group icons and the reception group icons, the group icon indicating a transmission data group or a reception data group processed by an instrument that detects the error.

8. The information processing apparatus according to claim 6, wherein if the error has occurred on a data transmission side of the one of the instances of inter-instrument communication, the error message is displayed at a first display position closer to a source group icon corresponding to the one of the instances of inter-instrument communication than a reception group icon corresponding to the one of the instances of inter-instrument communication, and if the error has occurred on a data reception side of the one of the instances of inter-instrument communication, the error message is displayed at a second display position closer to the reception group icon corresponding to the one of the instances of inter-instrument communication than the source group icon corresponding to the one of the instances of inter-instrument communication.

9. The information processing apparatus according to claim 1, wherein the processing circuitry is configured to generate the user interface that includes a group selection portion for selecting one group of the transmission data groups and the reception data groups as a display target.

10. The information processing apparatus according to claim 9, wherein the group selection portion includes an instrument list of instruments that process the transmission data groups or the reception data groups, and the processing circuitry is configured to select, as the display target, the one group of the transmission data groups and the reception data groups that is processed by a selected instrument, the selected instrument being selected from the instrument list according to device selection information for the instrument list.

11. The information processing apparatus according to claim 9, wherein the group selection portion includes a group list including identifiers of the transmission data groups or the reception data groups, and the processing circuitry is configured to select the one group of the transmission data groups and the reception data groups as the display target according to group selection information for the group list.

12. The information processing apparatus according to claim 1, wherein the processing circuitry is configured to generate the user interface that includes a detail information display portion that allows switchable display of each piece of detail information of:

(a) device detail information which includes instrument-by-instrument detail information regarding the instruments;

(b) group detail information which includes group-by-group detail information regarding the transmission data groups or the reception data groups; and (c) terminal detail information which includes terminal-by-terminal detail information regarding transmitting terminals or receiving terminals for the instances of inter-instrument communication.

13. The information processing apparatus according to claim 12, wherein the device detail information includes detail information regarding a device error.

14. The information processing apparatus according to claim 12, wherein the group detail information includes detail information regarding communication data included in a group of the transmission data groups or the reception data groups.

15. The information processing apparatus according to claim 12, wherein the terminal detail information includes terminal error detail information which includes terminal-by-terminal error information regarding the transmitting terminals or the receiving terminals for the instances of inter-instrument communication.

16. The information processing apparatus according to claim 1, wherein the processing circuitry is configured to:

in response to a determination that a communication error has occurred on one of the instances of inter-instrument communication while the user interface is being displayed on the screen, update the user interface to indicate on the screen occurrence of the communication error on the one of the instances of inter-instrument communication.

17. An information processing method comprising:
receiving, by an information processing apparatus, instrument information from instruments that are communicatively connected to the information processing apparatus via a network, the instrument information specifying a plurality of instances of inter-instrument communication among the instruments, and identifying pieces of transmission data and pieces of reception data for the instances of inter-instrument communication;
arranging, by processing circuitry of the information processing apparatus according to the instrument information, the pieces of transmission data into transmission data groups and the pieces of reception data into reception data groups, transmission processing within a respective transmission data group being collectively controlled, and reception processing within a respective reception data group being collectively controlled; and
generating, by the processing circuitry of the information processing apparatus, a user interface for display on a screen according to the instrument information, the user interface including:
source group icons each representing a respective one of the transmission data groups; and
reception group icons each representing a respective one of the reception data groups.

18. A non-transitory computer-readable medium storing instructions which when executed by processing circuitry of an information processing apparatus cause the information processing apparatus to perform:
receiving instrument information from instruments that are communicatively connected to the information processing apparatus via a network, the instrument information specifying a plurality of instances of inter-instrument communication among the instruments, and identifying pieces of transmission data and pieces of reception data for the instances of inter-instrument communication;
arranging, according to the instrument information, the pieces of transmission data into transmission data groups and the pieces of reception data into reception data groups, transmission processing within a respective transmission data group being collectively controlled, and reception processing within a respective reception data group being collectively controlled; and
generating a user interface for display on a screen according to the instrument information, the user interface including:
source group icons each representing a respective one of the transmission data groups; and
reception group icons each representing a respective one of the reception data groups.

19. The information processing method according to claim 17, wherein the user interface includes connection lines each representing a respective one of the instances of inter-instrument communication and visually connecting a source group icon and a reception group icon corresponding to the respective one of the instances of inter-instrument communication.

20. The non-transitory computer-readable medium according to claim 18, wherein the user interface includes connection lines each representing a respective one of the instances of inter-instrument communication and visually connecting a source group icon and a reception group icon corresponding to the respective one of the instances of inter-instrument communication.

* * * * *